(12) United States Patent
Hilarides et al.

(10) Patent No.: US 8,973,738 B2
(45) Date of Patent: Mar. 10, 2015

(54) CLEANING DEVICE

(75) Inventors: Jim J. Hilarides, Racine, WI (US); Curtis H. Hubmann, Racine, WI (US); Andrew M. Bober, Racine, WI (US); Stephen C. Cook, Racine, WI (US); Jonathan L. Ludtke, Waterford, WI (US); Justin M. Nunez, East Troy, WI (US); Daniel Bullis, Madison, WI (US); Douglas E. Seals, Fitchburg, WI (US); Daniel J. Lee, Monticello, WI (US); Todd J. Bakken, Madison, WI (US); Chris Sherwin, Stoughton, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 14/008,060

(22) PCT Filed: Mar. 28, 2012

(86) PCT No.: PCT/US2012/030985
§ 371 (c)(1),
(2), (4) Date: Sep. 27, 2013

(87) PCT Pub. No.: WO2012/135369
PCT Pub. Date: Oct. 4, 2012

(65) Prior Publication Data
US 2014/0020202 A1 Jan. 23, 2014

Related U.S. Application Data

(60) Provisional application No. 61/516,132, filed on Mar. 28, 2011, provisional application No. 61/592,374, filed on Jan. 30, 2012.

(51) Int. Cl.
*B65G 45/24* (2006.01)
*B65G 45/10* (2006.01)
(Continued)

(52) U.S. Cl.
CPC ............. *B65G 45/10* (2013.01); *B08B 1/008* (2013.01); *B08B 9/00* (2013.01); *B08B 9/049* (2013.01)
USPC ............................................ 198/494; 198/498

(58) Field of Classification Search
CPC .......... B65G 45/10; B08B 9/055; B08B 9/02; B08B 9/027
USPC ................... 198/494, 498; 15/104.03, 104.05
See application file for complete search history.

(56) References Cited

U.S. PATENT DOCUMENTS
2,858,556 A 11/1958 Van der Lans
4,121,320 A 10/1978 Feiner
(Continued)

FOREIGN PATENT DOCUMENTS
CN 2706251 6/2005
FR 2894855 6/2007
(Continued)

OTHER PUBLICATIONS
International Search Report PCT/US2012/030985 dated Oct. 10, 2012.
(Continued)

*Primary Examiner* — James R Bidwell
(74) *Attorney, Agent, or Firm* — Michael Best & Friedrich LLP

(57) ABSTRACT

A cleaning device for cleaning a conveyor system including a slotted track that defines an elongate path along which product is moved and that has opposed glide surfaces from which product is suspended. The conveyor system also includes a wall that is disposed above the track and that cooperates with the track to define a product passageway along the elongate path. The cleaning device includes a drive unit, a wheel rotatably coupled to the drive unit and engageable with the wall within the product passageway to move the drive unit along the slotted track, a glide coupled to the drive unit and engageable with the glide surfaces to support the drive unit on the slotted track, and a cleaning implement coupled to the drive unit to clean the track.

21 Claims, 27 Drawing Sheets

(51) Int. Cl.
*B08B 1/00* (2006.01)
*B08B 9/00* (2006.01)
*B08B 9/049* (2006.01)

(56) References Cited

U.S. PATENT DOCUMENTS

| | | | |
|---|---|---|---|
| 4,418,437 A | 12/1983 | French | |
| 5,161,919 A | 11/1992 | Smith | |
| 5,396,982 A * | 3/1995 | Wicha | 198/494 |
| 5,565,633 A | 10/1996 | Wernicke | |
| 6,249,927 B1 | 6/2001 | Ando | |
| 7,328,475 B2 | 2/2008 | Smith et al. | |
| 7,743,450 B2 | 6/2010 | Rouillard | |
| 7,752,700 B2 * | 7/2010 | Rouillard et al. | 15/104.061 |
| 7,979,945 B2 | 7/2011 | Dayton et al. | |
| 8,196,251 B2 | 6/2012 | Lynch | |
| 2005/0268940 A1 | 12/2005 | Vohra | |
| 2007/0056606 A1 | 3/2007 | Rouillard et al. | |
| 2011/0017233 A1 | 1/2011 | Hilarides | |

FOREIGN PATENT DOCUMENTS

| | | |
|---|---|---|
| GB | 2287767 | 9/1995 |
| JP | 51-090556 | 7/1976 |
| JP | 59-209691 | 11/1984 |
| JP | 60-002519 | 1/1985 |
| JP | 01-90213 | 6/1989 |
| JP | 0624540 | 2/1994 |
| JP | 06-115661 | 4/1994 |
| JP | 1990020991 | 2/1999 |
| JP | 11-253902 | 9/1999 |
| JP | 2001001890 | 1/2001 |
| JP | 2001269620 | 10/2001 |
| JP | 02-075513 | 3/2002 |
| JP | 2002220049 | 8/2002 |
| JP | 2004209321 | 7/2004 |
| JP | 2005-238345 | 9/2005 |
| JP | 06-227642 | 8/2006 |
| JP | 2007-251038 | 9/2007 |
| JP | 2008-025283 | 2/2008 |
| KR | 20010044631 | 6/2001 |
| KR | 10-0770976 | 10/2007 |
| WO | 2009/114845 | 9/2009 |

OTHER PUBLICATIONS

Written Opinion PCT/US2012/030985 dated Oct. 10, 2012.
International Preliminary Report on Patentability Chaper II PCT/US2012/030985 dated May 13, 2013.
EP097186696 Extended European Search Report dated May 4, 2012 (25 pages).
Australian Patent First Office Examination Report for Application No. 2009223304 dated Dec. 11, 2012 (4 pages).
Office Action from the US Patent and Trademark Office for U.S. Appl. No. 13/619,847 dated Feb. 6, 2013 (16 pages).
Second Office Action from the State Intellectual Property Office of the People's Republic of China for Application No. 200980116215.7 dated Mar. 25, 2013 (11 pages).
Third Office Action from the State Intellectual Property Office of the People's Republic of China for Application No. 200980116215.7 dated Aug. 2, 2013 (3 pages).
EP131690810 Extended European Search Report dated Jun. 18, 2013 (8 pages).
First Office Action from the Japanese Patent Office for JP2010550917 dated May 14, 2013 (3 pages).
Second Office Action from the Japanese Patent Office for JP2010550917 dated Jan. 7, 2014 (4 pages).

* cited by examiner

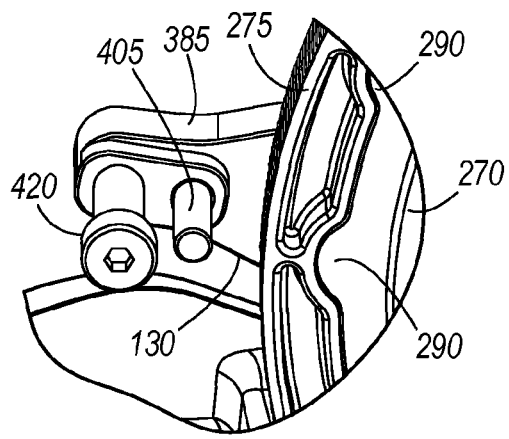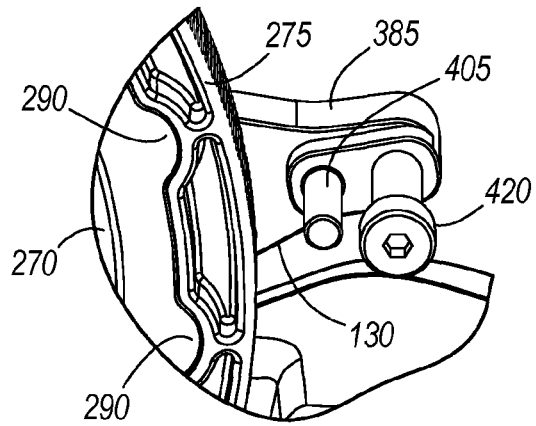
FIG. 18    FIG. 19
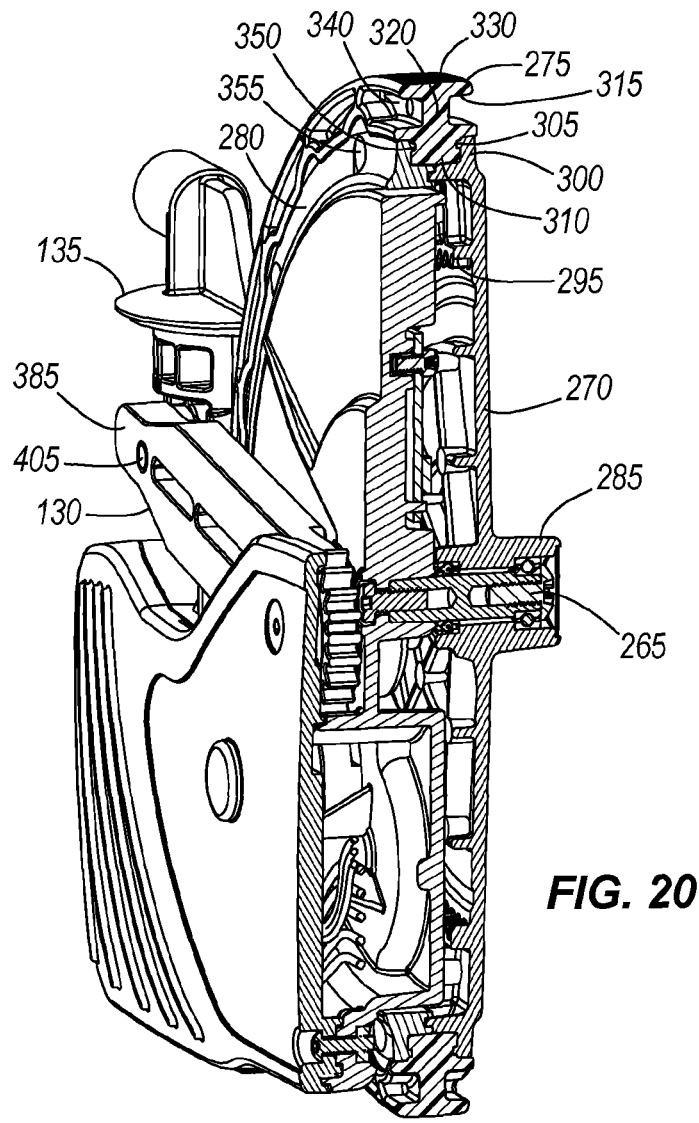
FIG. 20

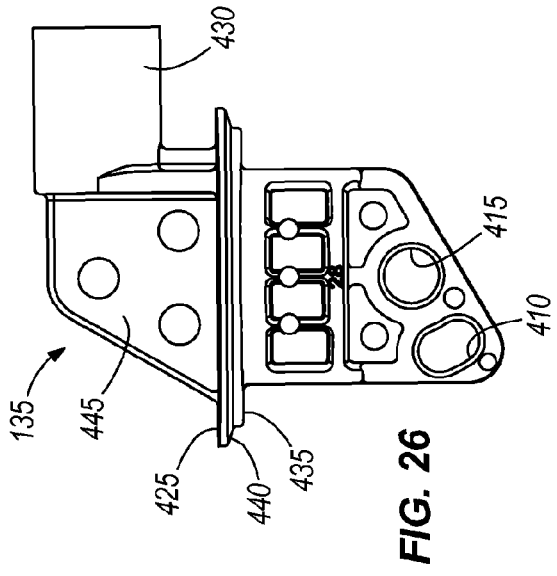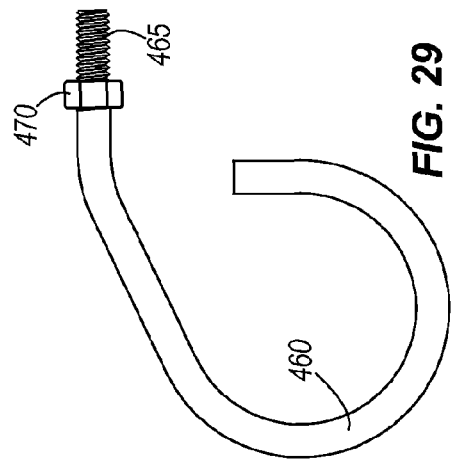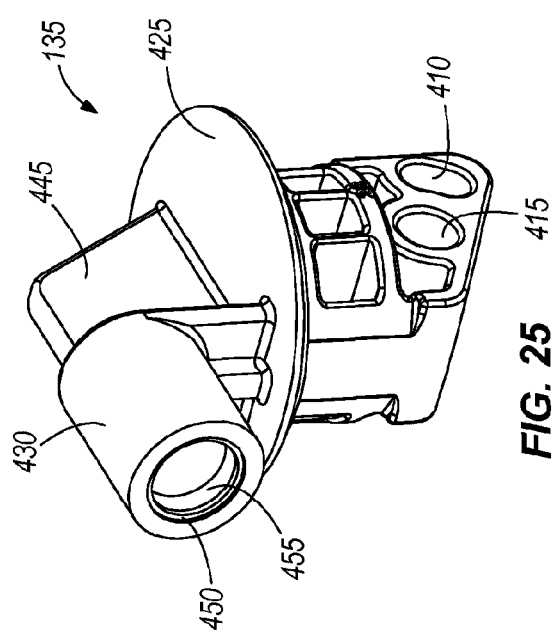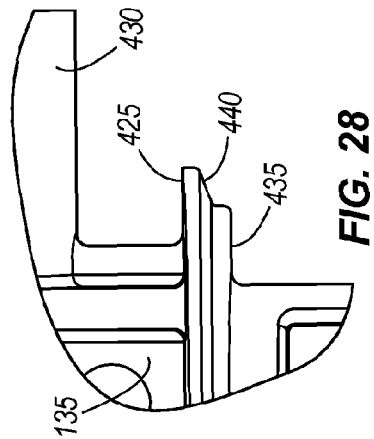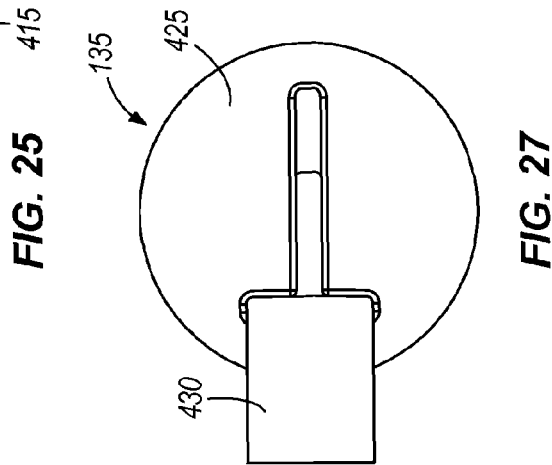

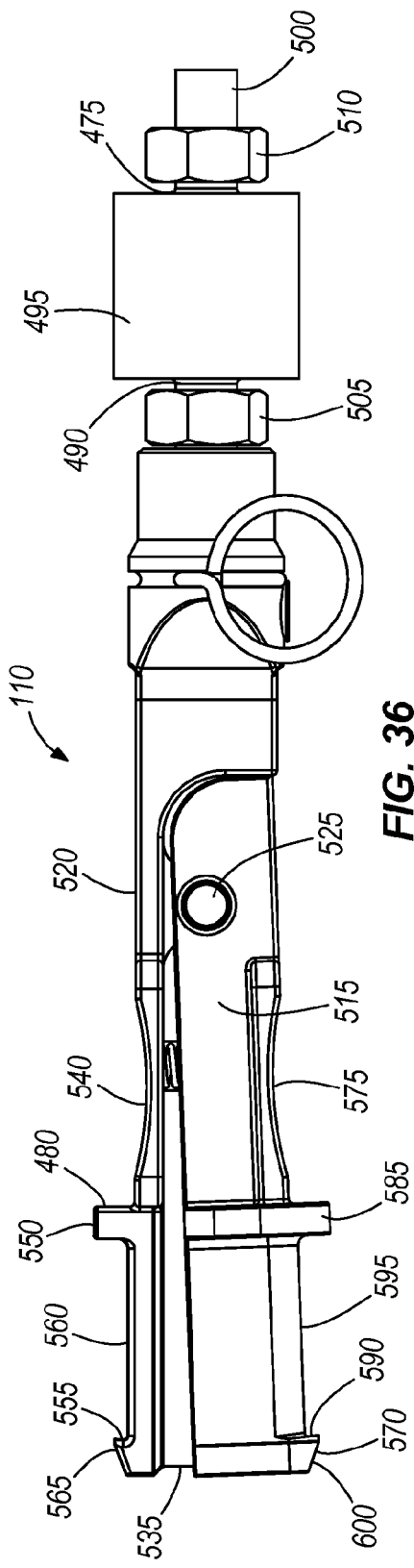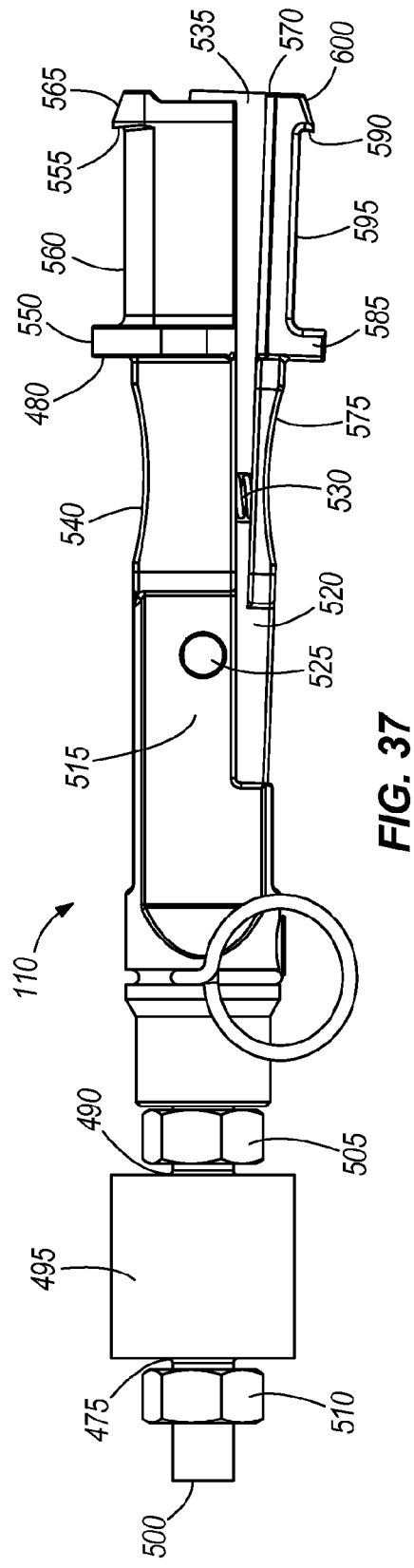
FIG. 36
FIG. 37

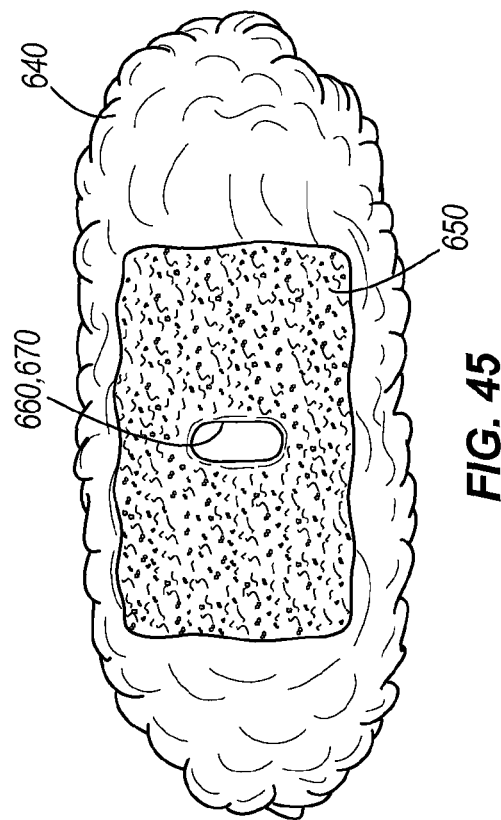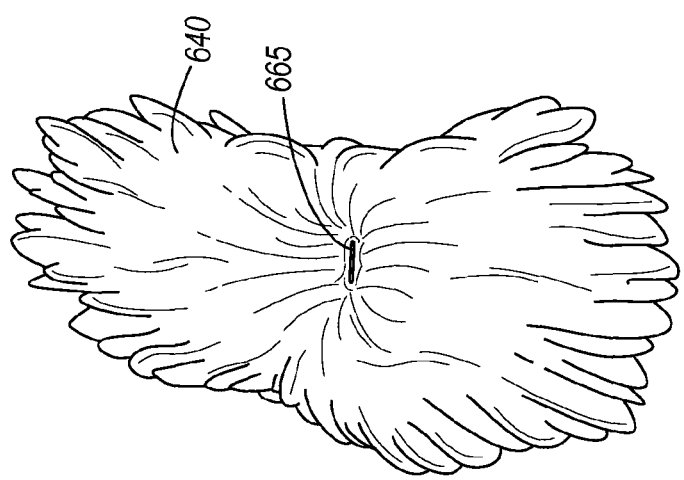

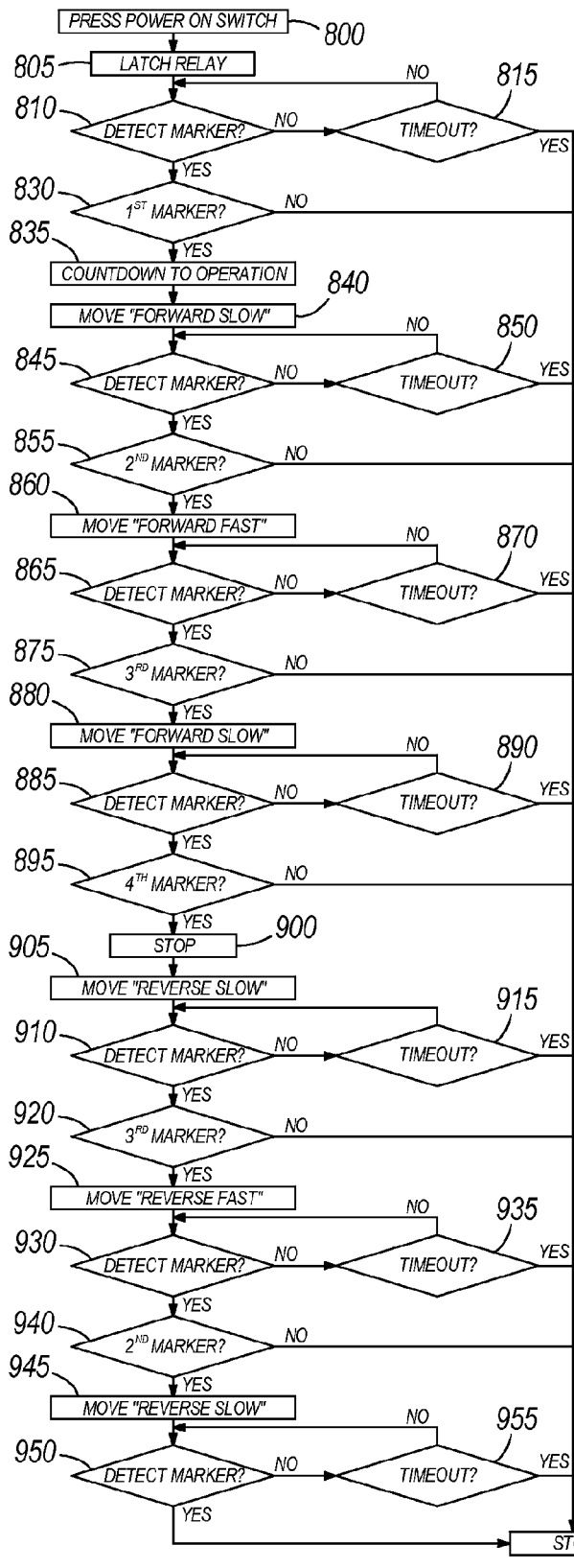
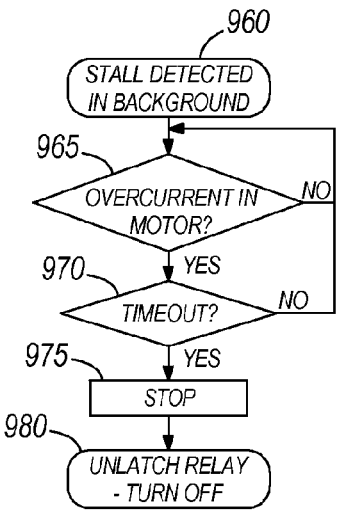
FIG. 57
FIG. 58

CLEANING DEVICE

CROSS-REFERENCE TO RELATED APPLICATIONS

The present patent application is a national stage filing under 35 U.S.C. §371 of International Application No. PCT/US2012/030985, filed on 28 Mar. 2012, which claims the benefit of U.S. Provisional Patent Application No. 61/516,132 filed Mar. 28, 2011, and U.S. Provisional Patent Application No. 61/592,374 filed Jan. 30, 2012, the content of which are incorporated herein by reference in their entireties.

BACKGROUND

The present invention relates to a cleaning device, and more particularly, to a cleaning device for cleaning surfaces of conveyor systems.

Conveyor systems are used in a number of different industries to transport items of all types. Some types of conveyor systems include a track that has an interior along which a portion of the conveyor system and/or a portion of items conveyed by the conveyor system pass. For example, some conveyor systems in the beverage industry transport bottles along an elongated track using the neck of the bottle. In these conveyor systems, the top of each bottle extends into an interior space of the elongated track, which typically include a longitudinal slot through which the neck of the bottle extends. In some conveyor systems, compressed air directly, or indirectly, urges the bottle along the conveyor path.

Over time, the interior of the track and other portions of the conveyor system can accumulate dust, microorganisms, and other contaminants during operation. In many applications (e.g., in beverage bottle conveying applications), this not only presents issues with regard to movement of items along the track, but can also present an unacceptable risk of bottle and beverage contamination. As a result, the track must be cleaned on a regular basis to ensure proper operation and sanitation. Track cleaning is currently typically performed manually by laboriously wiping the track with a dampened cloth. Since the track in many conveyor systems is typically overhead, cleaning often requires the use of lift devices that increase the time and cost of the cleaning.

SUMMARY

In one aspect, the present invention provides a cleaning device for cleaning a conveyor system that includes a slotted track defining an elongate path along which product is moved. The track has opposed glide surfaces from which product is suspended, and the conveyor system also includes a wall that is disposed above the slotted track and that cooperates with the track to define a product passageway along the elongate path. The cleaning device includes a drive unit, a wheel rotatably coupled to the drive unit and engageable with the wall within the product passageway to move the drive unit along the slotted track, a glide coupled to the drive unit and engageable with the glide surfaces to support the drive unit on the slotted track, and a cleaning implement. The cleaning implement is coupled to the drive unit and positionable within the product passageway to clean the track.

In another aspect, the presents invention provides a cleaning implement for a cleaning device that is operable to clean a conveyor system including a slotted track defining an elongate path along which product is moved. The conveyor system also includes a wall that cooperates with the slotted track to define a product passageway along the elongate path. The cleaning implement includes a first flexible cleaning element defining a first hole, a second flexible cleaning element defining a second hole aligned with the first hole, and a grommet attachable to the cleaning device and extending through the first hole and the second hole to attach the second cleaning element to the first cleaning element.

In another aspect, the present invention provides a cleaning device for cleaning a conveyor system including a slotted track that defines an elongate path along which product is moved and that has opposed glide surfaces from which product is suspended. The cleaning device includes a drive unit that has a housing, and a wheel assembly that has a wheel with a hub rotatably coupled to the drive unit and an integrated wheel gear formed concentrically between the hub and an outer periphery of the wheel. The cleaning device also includes a motor that is disposed in the housing and that is operably coupled to the wheel to move the drive unit along the slotted track, the motor including a drive gear and a driven gear coupled between the drive gear and the wheel gear to drive the wheel. The cleaning device also includes a cleaning implement that is coupled to the drive unit and that is positioned to clean the track.

In another aspect, the present invention provides a cleaning device for cleaning a conveyor system that includes a slotted track defining an elongate path along which product is moved. The track has opposed glide surfaces from which product is suspended. The cleaning device includes a drive unit that has a housing, a wheel assembly that has a wheel with a hub rotatably coupled to the housing to move the drive unit along the slotted track, and a glide that is coupled to the drive unit and that is engageable with the slotted track. The cleaning device also includes an attachment mechanism that is defined by an elongated body having a first end attached to the glide and a second end opposite the first end, and a cleaning implement that is coupled to the second end of the attachment mechanism and that is positioned to clean the track.

In another aspect, the present invention provides a cleaning device for cleaning a conveyor system including a slotted track that defines an elongate path along which product is moved and that has opposed glide surfaces from which product is suspended. The cleaning device includes a drive unit that has a housing, a wheel rotatably coupled to the housing to move the drive unit along the slotted track, and a glide that is coupled to the drive unit and that is engageable with the slotted track to support the drive unit on the track. The cleaning device also includes a cleaning implement that is coupled to the drive unit and that is positioned to clean the track, a motor that is disposed in the housing and that is operably coupled to the wheel to move the drive unit along the slotted track, and a power source that is disposed in the housing. The cleaning device also includes a visible indicator that is coupled to the housing and a controller that is disposed in the housing. The visible indicator is variable between a first state indicative of a first condition of the drive unit and a second state indicative of a second condition of the drive unit. The controller is in electrical communication with the power source to control the power supplied to and provided by the power source. The controller also is in electrical communication with the motor to control movement of the drive unit along the slotted track, and is in electrical communication with the visible indicator to vary the visible indicator between the first state and the second state.

In another aspect, the present invention provides a conveyor system including a slotted track that defines an elongate path along which product is moved. The track has opposed glide surfaces from which product is suspended. The conveyor system also includes a wall that is disposed above the slotted track and that cooperates with the track to define a product passageway along the elongate path, a track marker that is positioned along the track, and a cleaning device. The cleaning device includes a drive unit that is engageable with and movable along the track, and a cleaning implement that is coupled to the drive unit and that is positionable within the product passageway to clean the track. The cleaning device further includes a sensor device that is positioned to detect the track marker and a controller that is in communication with the sensor device to control the cleaning device in response to detection of the track marker.

In another aspect, the present invention provides a cleaning device for cleaning a conveyor system that includes a slotted track defining an elongate path along which product is moved. The track has opposed glide surfaces from which product is suspended, and the conveyor system also includes a wall that is disposed above the slotted track and that cooperates with the track to define a product passageway along the elongate path. The cleaning device includes a drive unit, a wheel rotatably coupled to the drive unit to move the drive unit along the slotted track, a suspension arm pivotably coupled to the drive unit and biased to force the wheel into engagement with the wall, and a cleaning implement coupled to the drive unit and positionable within the product passageway to clean the track.

Other aspects of the invention will become apparent by consideration of the detailed description and accompanying drawings.

BRIEF DESCRIPTION OF THE DRAWINGS

FIG. 18 is a perspective view of a portion of the drive unit.

FIG. 19 is another perspective view of another portion of the drive unit.

FIG. 20 is a section view of the drive unit of FIG. 8 taken along line 15-15.

FIG. 25 is a perspective view of a glide of the drive unit of FIG. 8.

FIG. 26 is a side view of the glide of FIG. 25.

FIG. 27 is a top view of the glide of FIG. 25.

FIG. 28 is an enlarged side view of the glide of FIG. 25.

FIG. 29 is a side view of a hook of the drive unit of FIG. 8.

FIG. 36 is a side view of the attachment mechanism.

FIG. 37 is another side view of the attachment mechanism.

FIG. 43 is an end view of a portion of one cleaning pad prior to attachment of the grommet.

FIG. 44 is an end view of one cleaning pad of FIG. 40.

FIG. 45 is an end view of the cleaning pads of FIG. 40.

FIG. 57 is a flowchart of operation of the cleaning device in the conveyor system.

FIG. 58 is another flowchart of operation of the cleaning device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
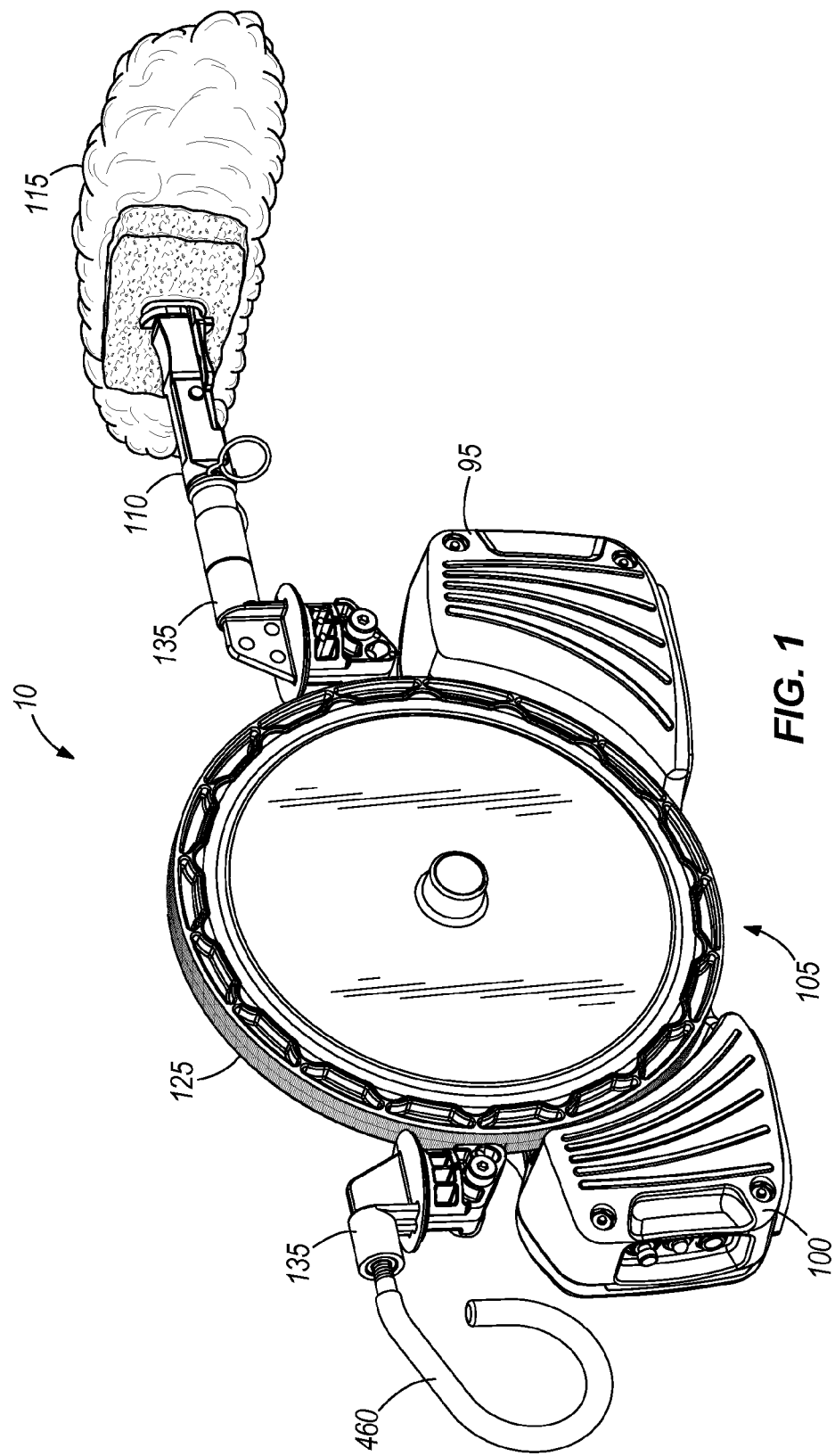
FIG. 1 is a perspective view of a cleaning device embodying the present invention.
Figure 2:
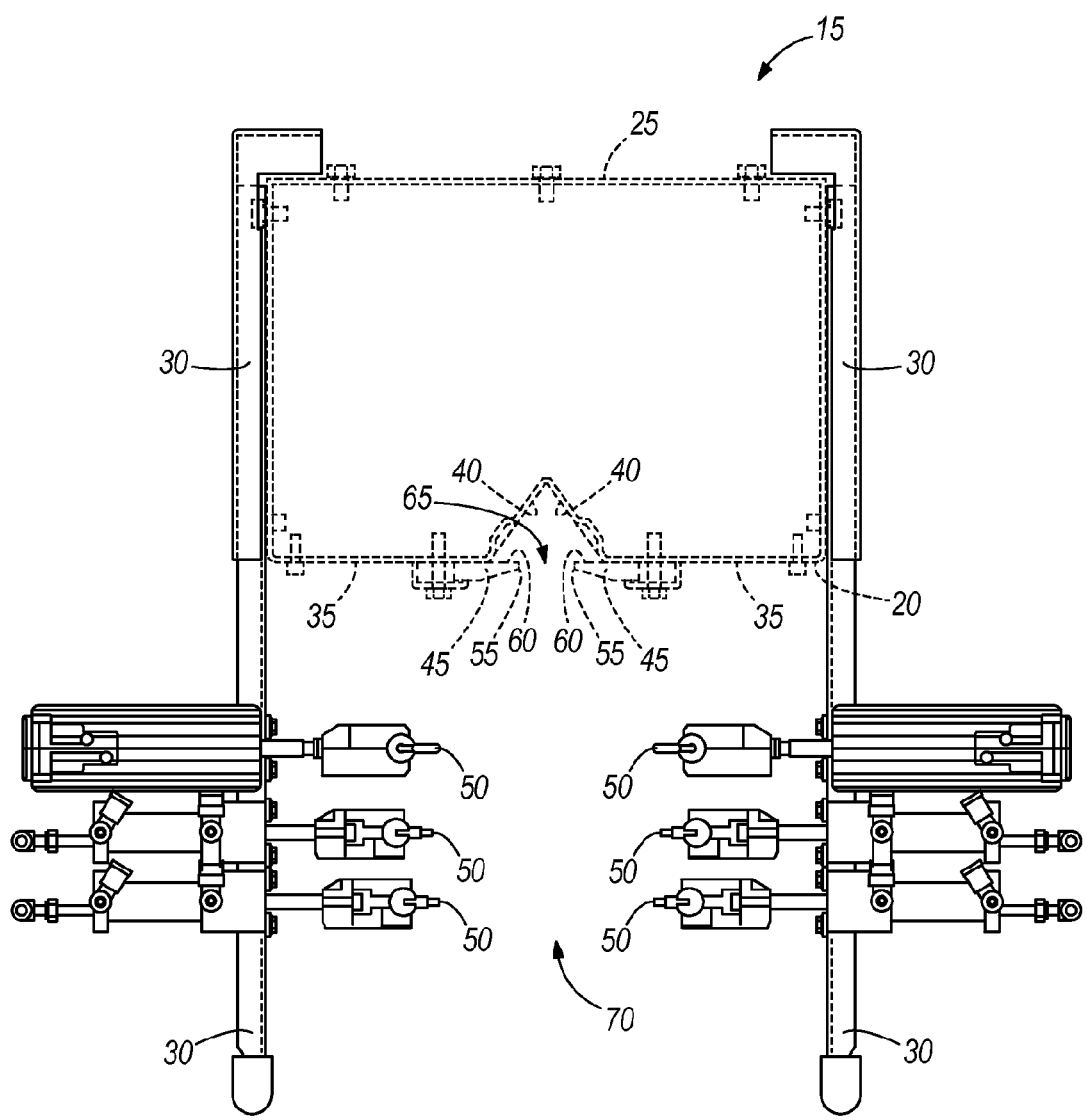
FIG. 2 is a schematic view of a conveyor system including a track and other surfaces for cleaning by the cleaning device.
Figure 3:
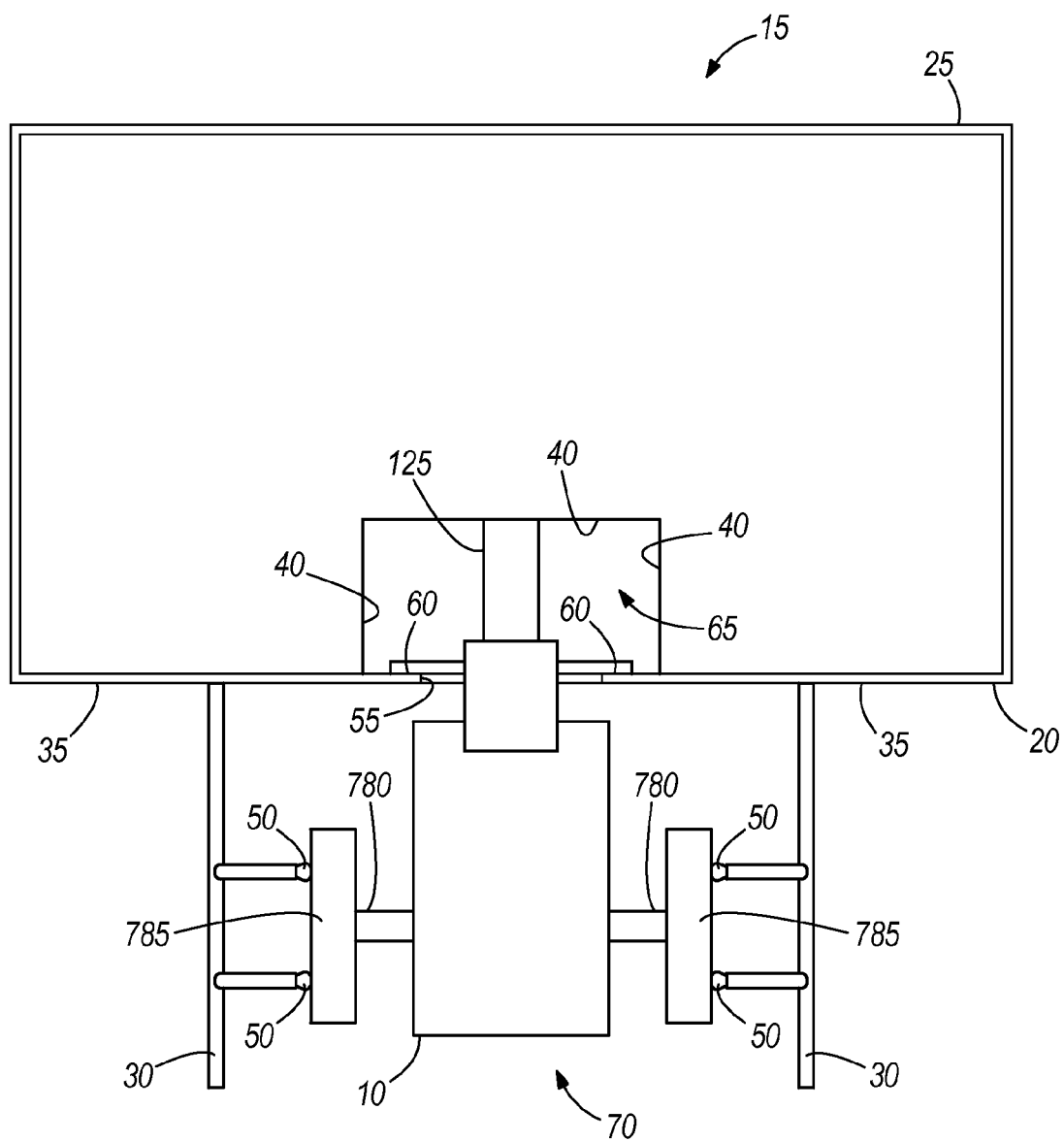
FIG. 3 is a schematic view of another conveyor system including a track and other surfaces for cleaning by the cleaning device.

FIG. 1 shows a cleaning device 10 for cleaning surfaces and other areas of a conveyor system 15 (see FIGS. 2 and 3). With reference to FIGS. 1-3, the cleaning device 10 is engageable with the conveyor system 15 to clean surfaces and other areas of the conveyor system 15. With reference to FIGS. 2 and 3, the illustrated conveyor system 15 includes an air conveyor 20 defining a housing 25 that has lower walls 35 at an underside of the air conveyor 20, and opposed track walls 40 that are coupled to the lower walls 35 near the middle of the air conveyor 20. As illustrated in FIG. 2, the air conveyor 20 includes two track walls 40 that are angled inward toward each other (upward as viewed in FIG. 2) and recessed relative to the lower walls 35. As illustrated in FIG. 3, the air conveyor 20 includes three track walls 40 that are recessed relative to the lower walls 35.

FIGS. 2 and 3 show that the conveyor system 15 also includes track elements 45 coupled to each of the lower walls 35, and guide rails 50 disposed below the track elements 45. The track elements 45 extend toward each other so that inward ends of the track elements 45 are adjacent and spaced apart from each other. The track elements 45 cooperate with each other to define a slotted track 55 that receives and suspends product (e.g., bottles) for movement through the conveyor system 15. The track elements 45 have glide surfaces 60 that support the product to be moved by the air conveyor 20, and the glide surfaces 60 cooperate with the track walls 40 to define a product passageway 65 (e.g., for receiving the neck of bottles) through which a portion of the product passes. With regard to the conveyor system 15 illustrated in FIG. 2, the product passageway 65 has a triangular profile. With regard to the conveyor system 15 illustrated in FIG. 3, the product passageway 65 has a rectangular profile. Other cross-sectional profiles of the product passageway 65 are also possible and considered herein (e.g., square, trapezoidal, circular, etc.).

The guide rails 50 are coupled to the support structure 30 below the housing 25 to facilitate movement of product through the conveyor system 15. The guide rails 50 extend inward from the support structure 30 toward the opposite guide rails 50, and cooperate with each other to define a product channel 70. The conveyor system 15 illustrated in FIG. 2 includes three guide rails 50 positioned on either side of the product channel 70, whereas the conveyor system 15 illustrated in FIG. 3 includes two guide rails 50 on either side of the product channel 70. The conveyor system 15 can include any quantity of guide rails 50 to facilitate movement of product through the conveyor system 15.

Figure 5:
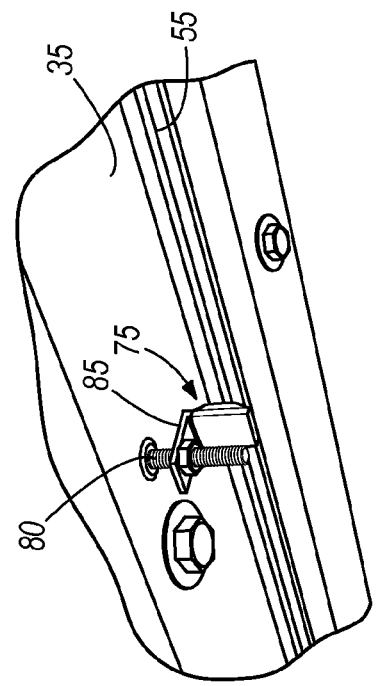
FIG. 5 is another perspective view of the portion of the track of FIG. 4 including a track marker coupled to the standoff.
Figure 4:
FIG. 4 is a perspective view of a portion of the track of FIG. 2 including a track marker standoff.
Figure 6:
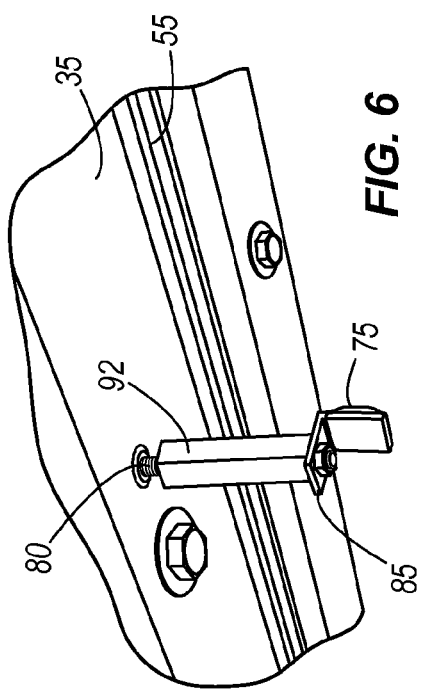
FIG. 6 is another perspective view of the portion of the track of Fig. for including an extension coupled to the standoff.
Figure 8:
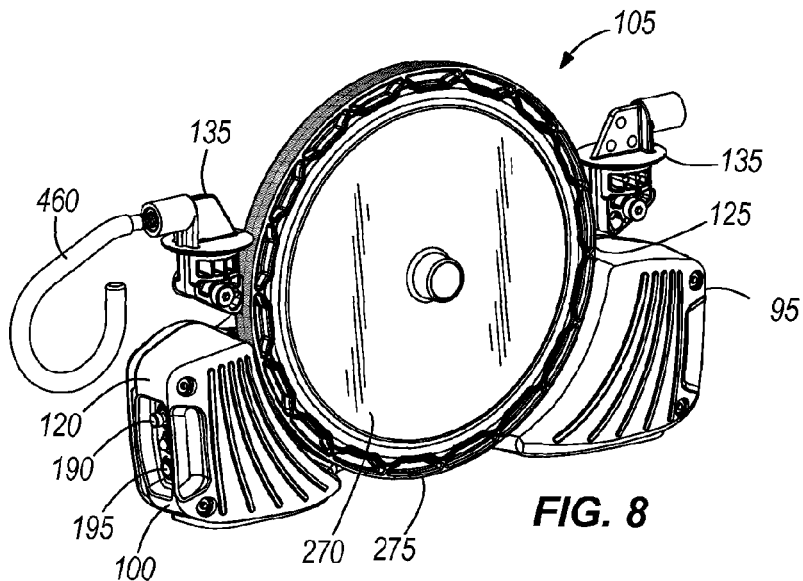
FIG. 8 is a perspective view of a drive unit of the cleaning device of FIG. 1.
Figure 9:
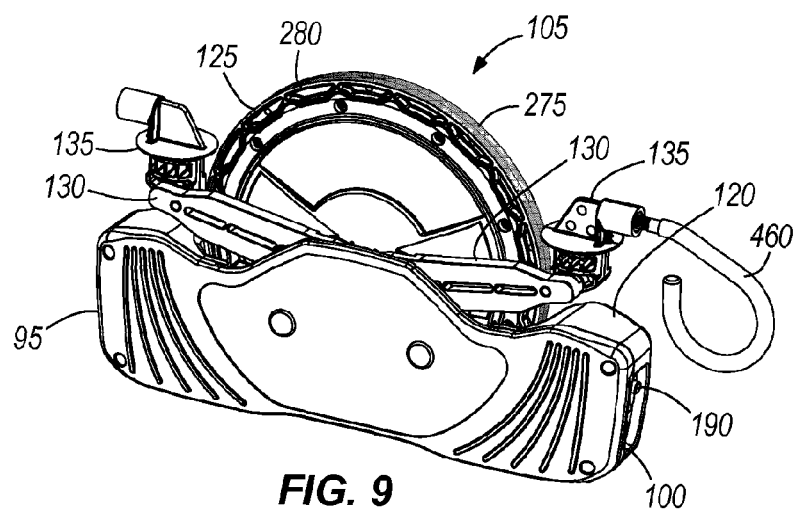
FIG. 9 is another perspective view of the drive unit of FIG. 8.
Figure 10:
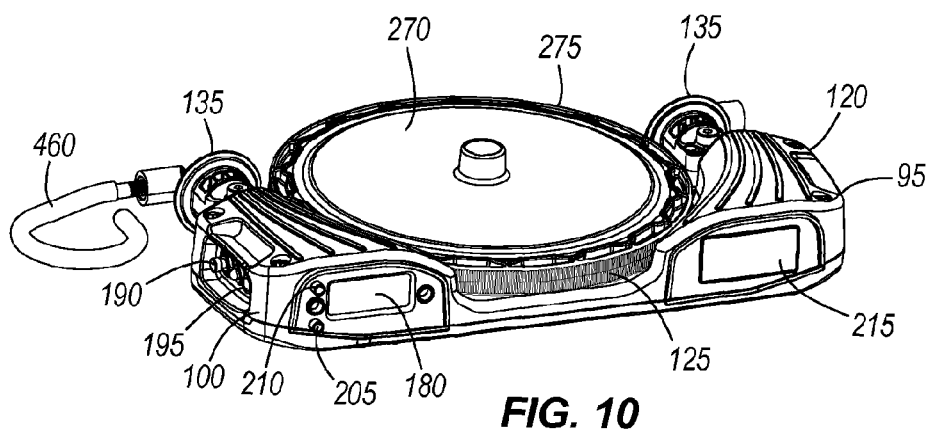
FIG. 10 is another perspective view of the drive unit of FIG. 8.
Figure 11:
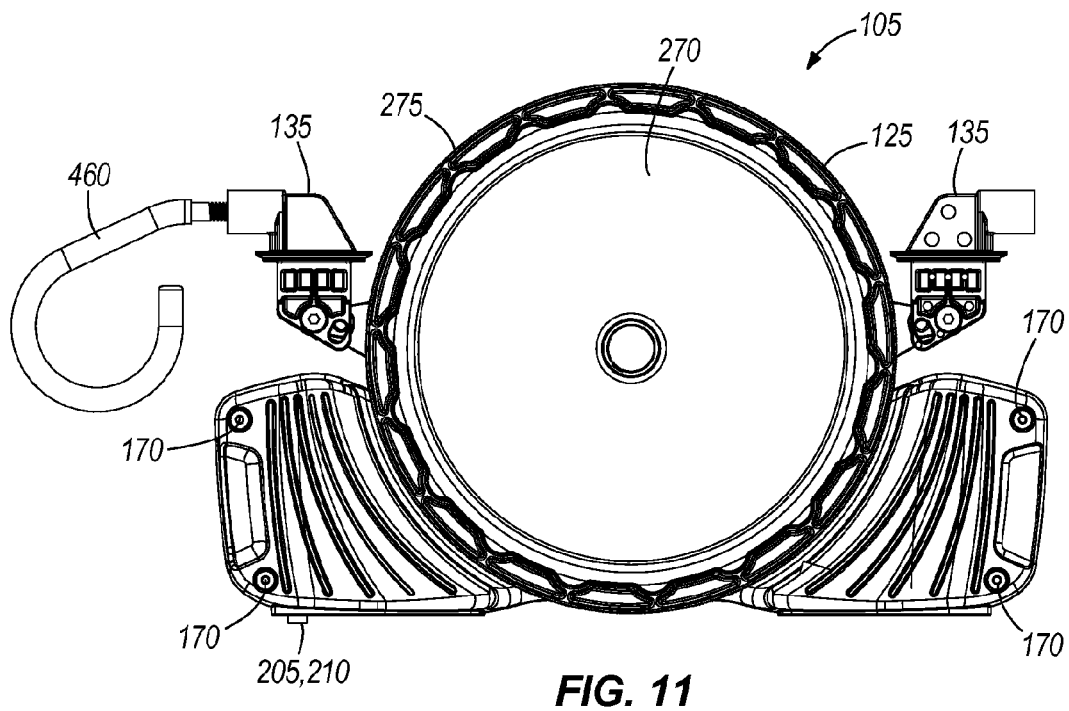
FIG. 11 is a side view of the drive unit of FIG. 8.
Figure 12:
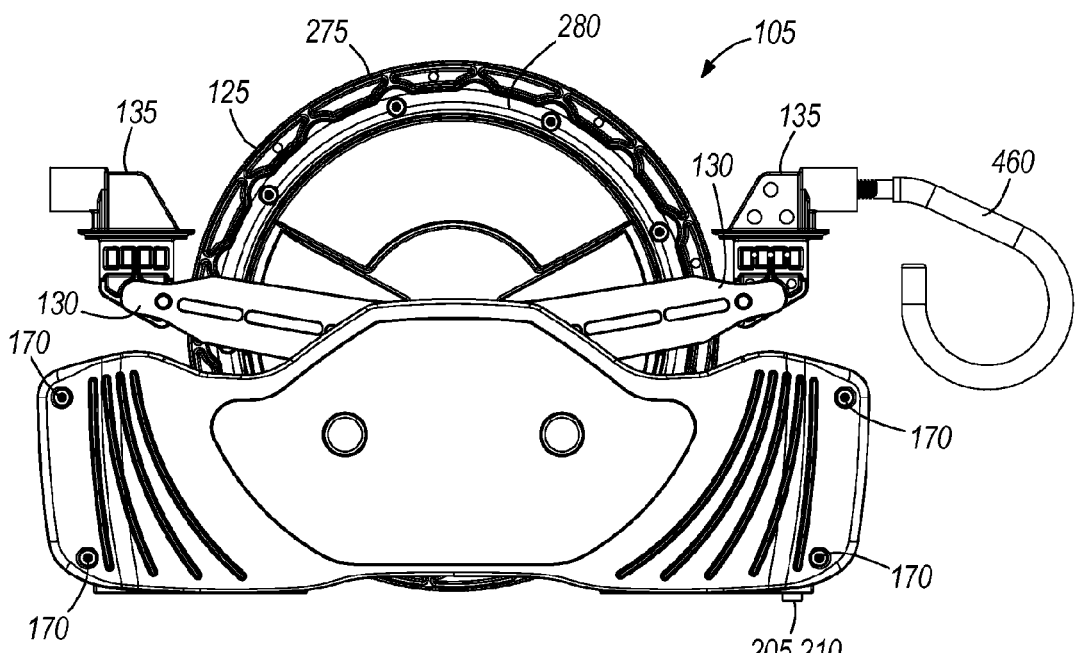
FIG. 12 is another side view of the drive unit of FIG. 8.
Figure 13:
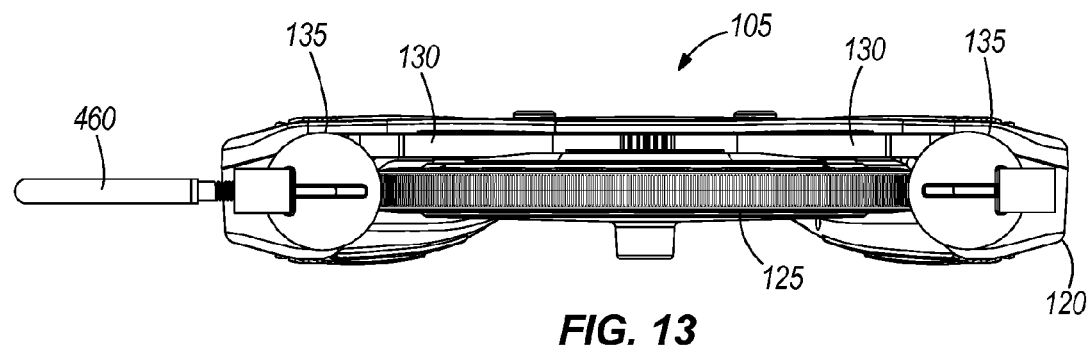
FIG. 13 is a top view of the clean the place of FIG. 8.
Figure 14:
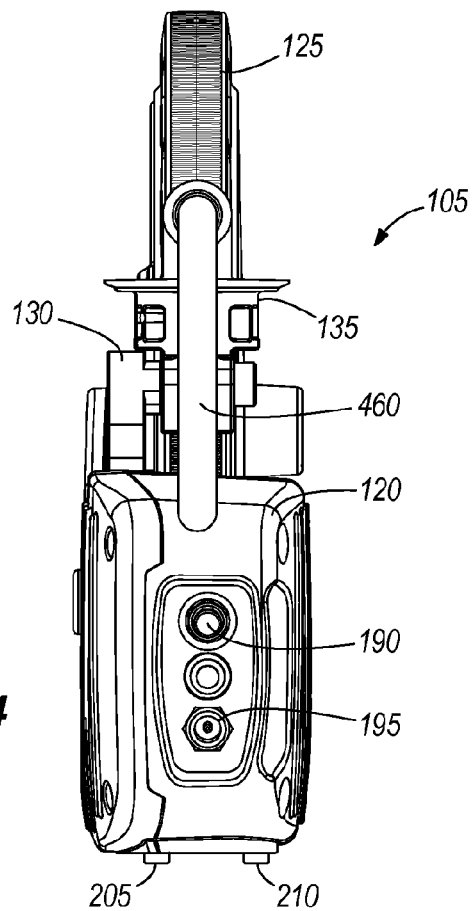
FIG. 14 is an end view of the drive unit of FIG. 8.

FIGS. 4-6 show that the conveyor system 15 also includes track markers 75 (one shown) coupled to standoffs 80 (one shown) that are spaced along the track 55 at predetermined intervals. The length of the standoffs 80 can be varied depending on dimensional characteristics of the conveyor system 15 in which the cleaning device 10 is used so that the cleaning device 10 is a universal cleaning apparatus among the different conveyor systems. As illustrated, the standoffs 80 are threaded studs welded to the underside of the track elements 45 to provide adjustment of the distance that the track markers 75 can be suspended below the track elements 45.

Figure 7:
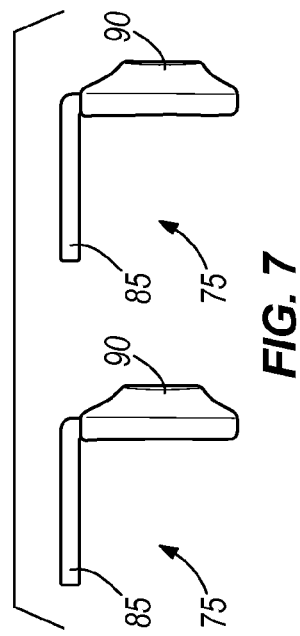
FIG. 7 is a side view of two magnets for use with the cleaning device.

The track markers 75 are suspended from the track elements 45 by the standoffs 80 and interact with the cleaning device 10 to control the direction and speed of the cleaning device 10 in the air conveyor 20. As illustrated in FIGS. 5-7, each track marker 75 includes a standoff adapter 85 attachable to a corresponding standoff 80, and a magnet 90 (e.g., permanent magnet) that generates a magnetic field. With reference to FIG. 6, a standoff extension 92 can be coupled to the standoff 82 to increase the distance the track marker 75 is suspended below the track 55. In some constructions, the track markers 75 can include RFID tags or other similar technology (e.g., infrared technology). With reference to FIGS. 5 and 7, the magnet 90 is oriented so that either the North pole or the South pole of the magnet 90 faces outward from the standoff adapter 85 toward the product passageway 65. As illustrated, the track marker 75 with the North pole facing outward is wrapped in red covering (e.g., plastic), and the track 55 marker with the South pole facing outward is wrapped in yellow covering (e.g., plastic). As described in detail below, the particular pole that faces outward from the standoff adapter 85 affects operation of the cleaning device 10.

In the illustrated construction, a first track marker 75 (e.g., North pole magnet) is coupled to the track 55 adjacent an opening to the track 55 on one end. A second track marker 75 (e.g., South pole magnet) is coupled to the track 55 and spaced apart from the first track marker 75 by a distance (e.g., 3-4 inches, or longer distances). A third track marker 75 (e.g., South pole magnet) is coupled to the track 55 closer to the other end of track 55 than the middle of the track 55. A fourth track marker 75 (e.g., North pole magnet) is coupled to the track 55 adjacent the opening at the other end of the track 55. In some constructions, the first and fourth track markers 75 are spaced inward from the respective openings approximately 6-12 inches. In other constructions, the first and fourth track markers 75 can be spaced inward other distances from the respective openings. Generally, the second and third track markers 75 are spaced relatively short distances from the respective first and fourth track markers 75. Additional track markers 75 can be located along the track 55 to further control operation of the cleaning device 10 (e.g., speed up, slow down, maintain speed, stop, etc.) as the device 10 moves on the track 55. The configuration of the track 55 can in part determine the quantity of track markers 75 needed for controlling the cleaning device 10.

The cleaning device 10 has a forward end 95 and a rearward end 100 relative to the direction of travel when the cleaning device 10 is first placed in the track 55. FIGS. 1 and 8-17 show that the cleaning device 10 includes a drive unit 105, an attachment mechanism 110, and a cleaning head or implement 115 that is coupled to the drive unit 105 by the attachment mechanism 110. The drive unit 105 includes a control housing 120, a wheel assembly 125, suspension arms 130, and glides 135. The control housing 120 includes a first housing portion 140 that is shaped to conform to the wheel assembly 125, and a second housing portion 145 integrally formed with the first housing portion 140. In some constructions, the second housing portion 145 can be a separate component from the first housing portion 140.

With reference to FIGS. 8, 10 and 14-17, the first housing portion 140 has a first compartment 150 that is located at the forward end 95 of the drive unit 105, a second compartment 155 that is located at the rearward end 100 of the drive unit 105, a third compartment 160 that interconnects the first compartment 150 and the second compartment 155, and a cover 165 that is attached to (e.g., by fasteners 170) and encloses the first, second, and third compartments 160. The illustrated first, second, and third compartments 160 define a unitary space within the first housing portion 140. As illustrated, the first compartment 150 supports a power source 175 for the drive unit 105 and houses an LCD screen 180 that is visible from adjacent the bottom of the drive unit 105, although the power source 175 and the LCD screen 180 can be located in other areas of the housing 120. The power source 175 includes a rechargeable battery pack, although other power sources are possible and considered herein (e.g., two-stroke internal combustion engine, etc.). The LCD screen 180 is capable of displaying information relevant to operation of the cleaning device 10 (e.g., operation time, use or cleaning cycles, distance traveled in English and/or metric units, status of power source, etc.).

The second compartment 155 supports a first controller 185 of the drive unit 105 and houses a power switch 190, a power source connection 195, a first LED 200, a second LED 205, a third LED 210, and a label area 215. The first controller 185 is in electrical communication with the power source 175, the power switch 190, the power source connection 195, and a switch relay (not shown) to control the power supplied to and provided by the power source 175. The first controller 185 also includes logic control for controlling operation of the cleaning device 10, including the information displayed on the LCD screen 180 and illumination of the first LED 200, the second LED 205, and the third LED 210.

The power switch 190 is accessible adjacent the rearward end 100 of the first housing portion 140 and can be manipulated (e.g., pushed) to turn the drive unit 105 on and off. As illustrated, the power switch 190 is coupled to the switch relay, which controls whether power is supplied to the drive unit 105 based on a signal from the first controller 185. The power source connection 195 is electrically coupled to the power source 175 for charging the battery pack. The power source connection 195 is accessible adjacent the rearward end 100 of the first housing portion 140 and can be coupled to a power cord (not shown).

The first LED 200 is located adjacent the top of the second compartment 155 and is indicative of the charge condition of the power source 175. In particular, the first LED 200 includes a flashing state (e.g., flashing green) that is indicative of the power source 175 being charged, and a solid or constant state (e.g., solid green) that is indicative of the power source 175 in a fully charged state. Alternatively, the first LED 200 can be located in other areas of the first housing portion 140.

The second and third LEDs 205, 210 are multi-color LEDs that are located adjacent the bottom of the second compartment 155. Alternatively, the second and third LEDs 205, 210 can be located adjacent the bottom of the first compartment 150 (e.g., on either side of the LCD screen), or in other areas of the first housing portion 140. The second LED 205 is indicative of a location of the drive unit 105 on the track 55. For example, the second LED 205 will illuminate with a first color (e.g., red) to indicate a first position of the cleaning device 10, and the second LED 205 will illuminate with a second color (e.g., yellow) to indicate a second position of the cleaning device 10.

The third LED 210 is indicative of an operating state of the cleaning device 10. For example, the third LED 210 will illuminate with a first color (e.g., flashing or solid green) when the cleaning device 10 is operating normally, and the third LED 210 will illuminate with a second color (e.g., flashing or solid red) when the cleaning device 10 is in an alarm condition (e.g., control error, abruptly stopped, over-current condition, etc.).

Figure 15:
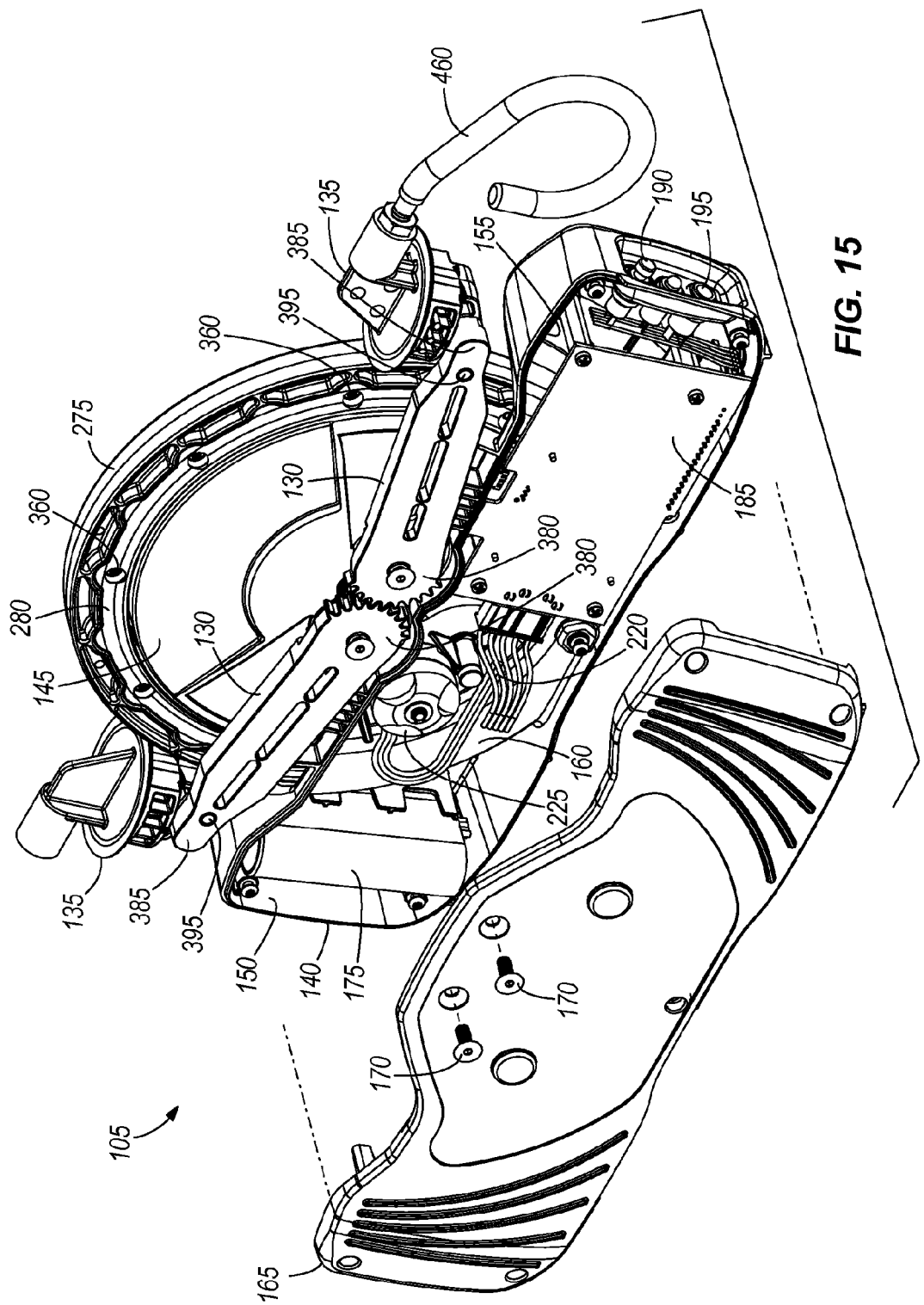
FIG. 15 is an exploded view of the drive unit of FIG. 8.

As shown in FIG. 15, the third compartment 160 is located directly below the second housing portion 145. The third compartment 160 supports a second controller 220 of the drive unit 105 and houses a motor 225 that is coupled to the wheel assembly 125. The second controller 220 is in electrical communication with the motor 225 and includes secondary logic control for controlling operation of the motor 225. In some constructions, the first controller 185 and the second controller 220 can be integrated as a single controller to provide control for all aspects of the cleaning device 10. The second controller 220 may include an LED (not shown) that can be selectively illuminated to communicate a state of the second controller 220, the motor 225, or both the second controller 220 and the motor 225.

Figure 17:
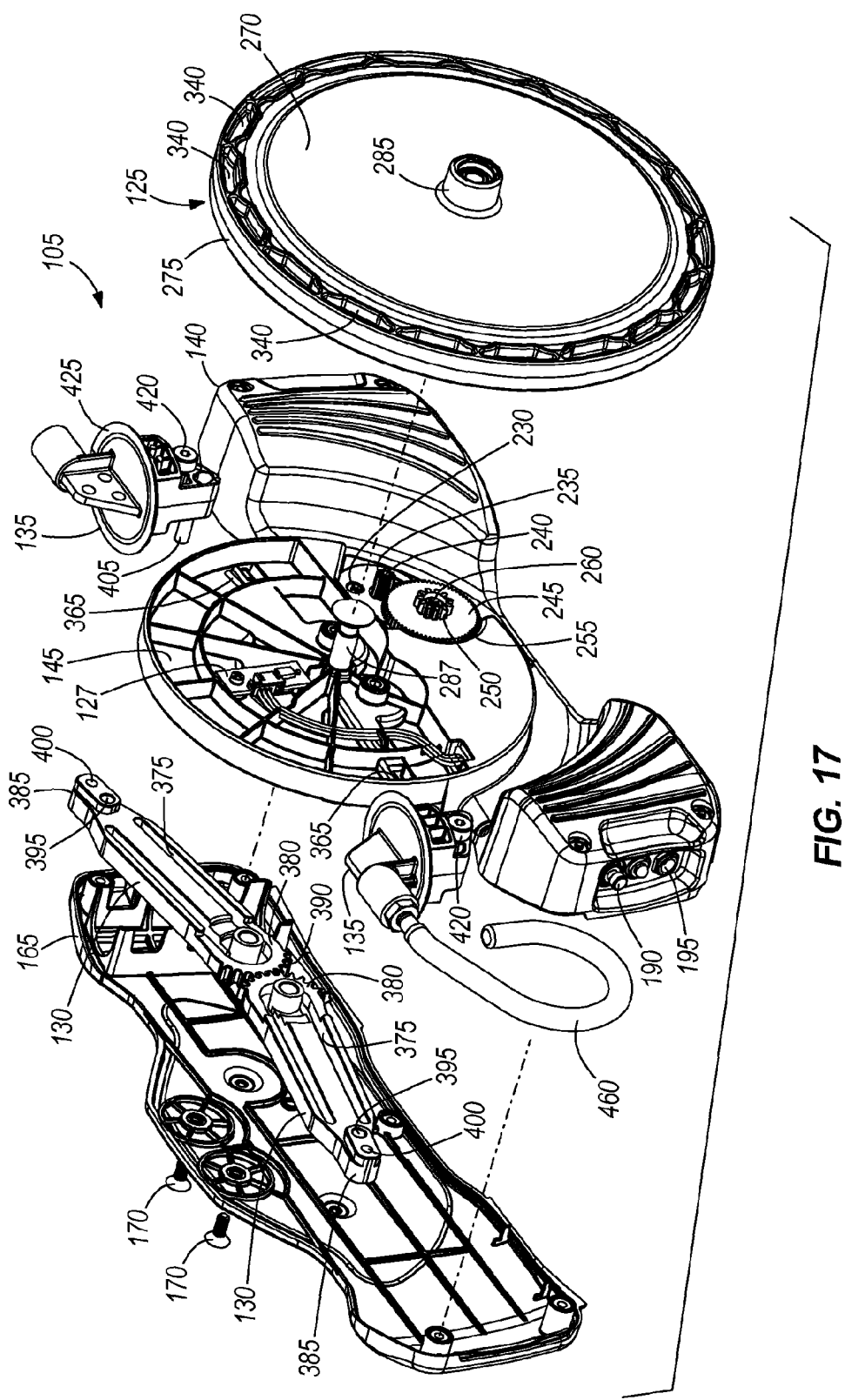
FIG. 17 is another exploded view of the drive unit of FIG. 8.
Figure 21:
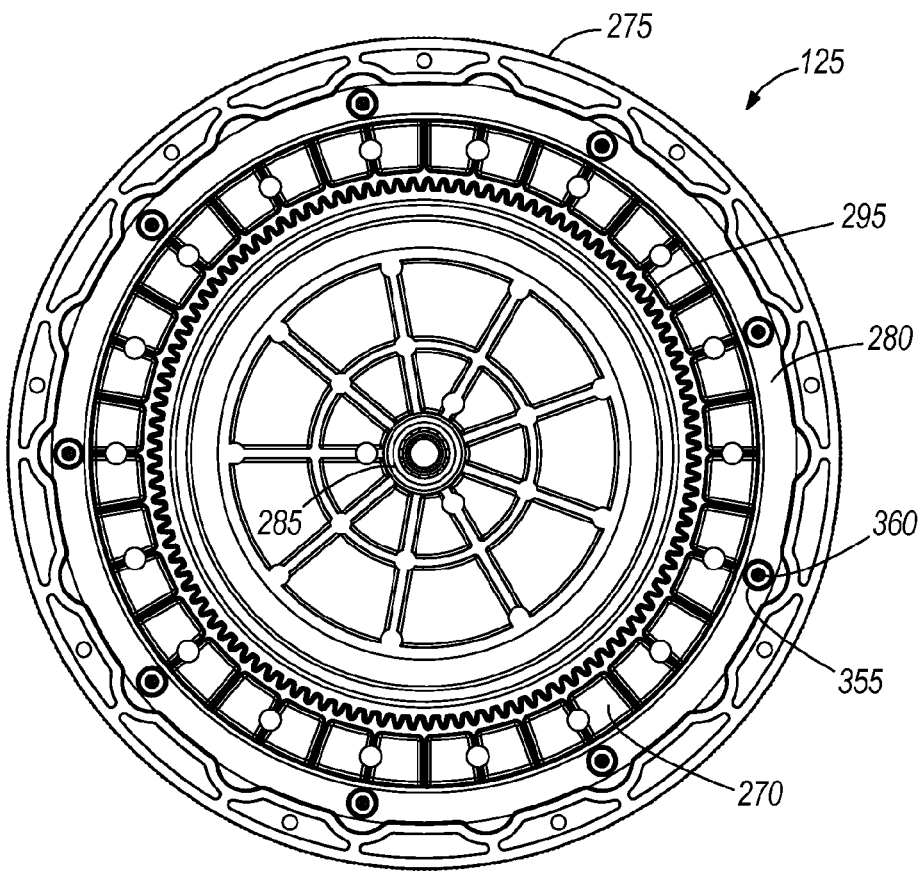
FIG. 21 is a side view of a wheel assembly of the drive unit of FIG. 8 including a wheel and a tire.
Figure 22:
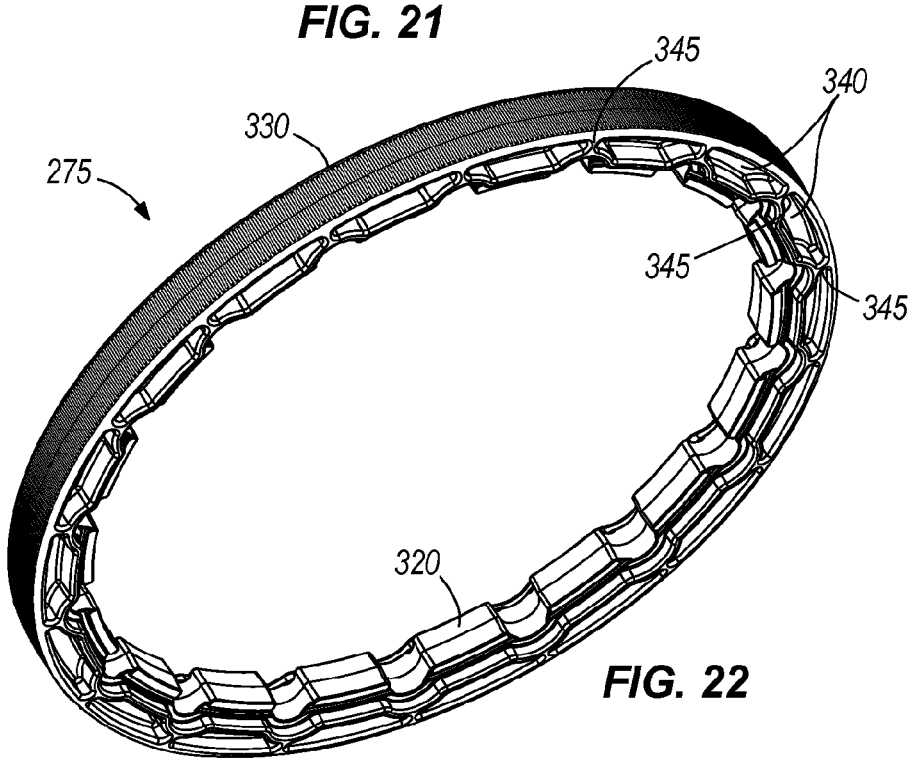
FIG. 22 is a perspective view of the tire.

The motor 225 is attached to a wall of the third compartment 160 by fasteners 230. The motor 225 can be any suitable prime mover (e.g., an electric AC motor, a brushless DC motor, etc.). As illustrated, the power source 175 is electrically coupled to the motor 225 to provide power to the motor 225. With reference to FIG. 17, the motor 225 includes a drive gear 235 that is coupled to a drive shaft 240 of the motor 225, and a driven gear 245 that is coupled to the drive gear 235. The gear reduction (e.g., 1:66) between the drive gear 235 and the driven gear 245 is selected to provide adequate torque for movement of the cleaning device 10 along the track 55. The driven gear 245 is coupled to a free spinning shaft 250 in the first housing portion 140, and includes a first gear portion 255 that is directly coupled to and rotatably driven by the drive gear 235, and a second gear portion 260 that rotates with the first gear portion 255 and that is drivingly coupled to the wheel assembly 125.

Figure 16:
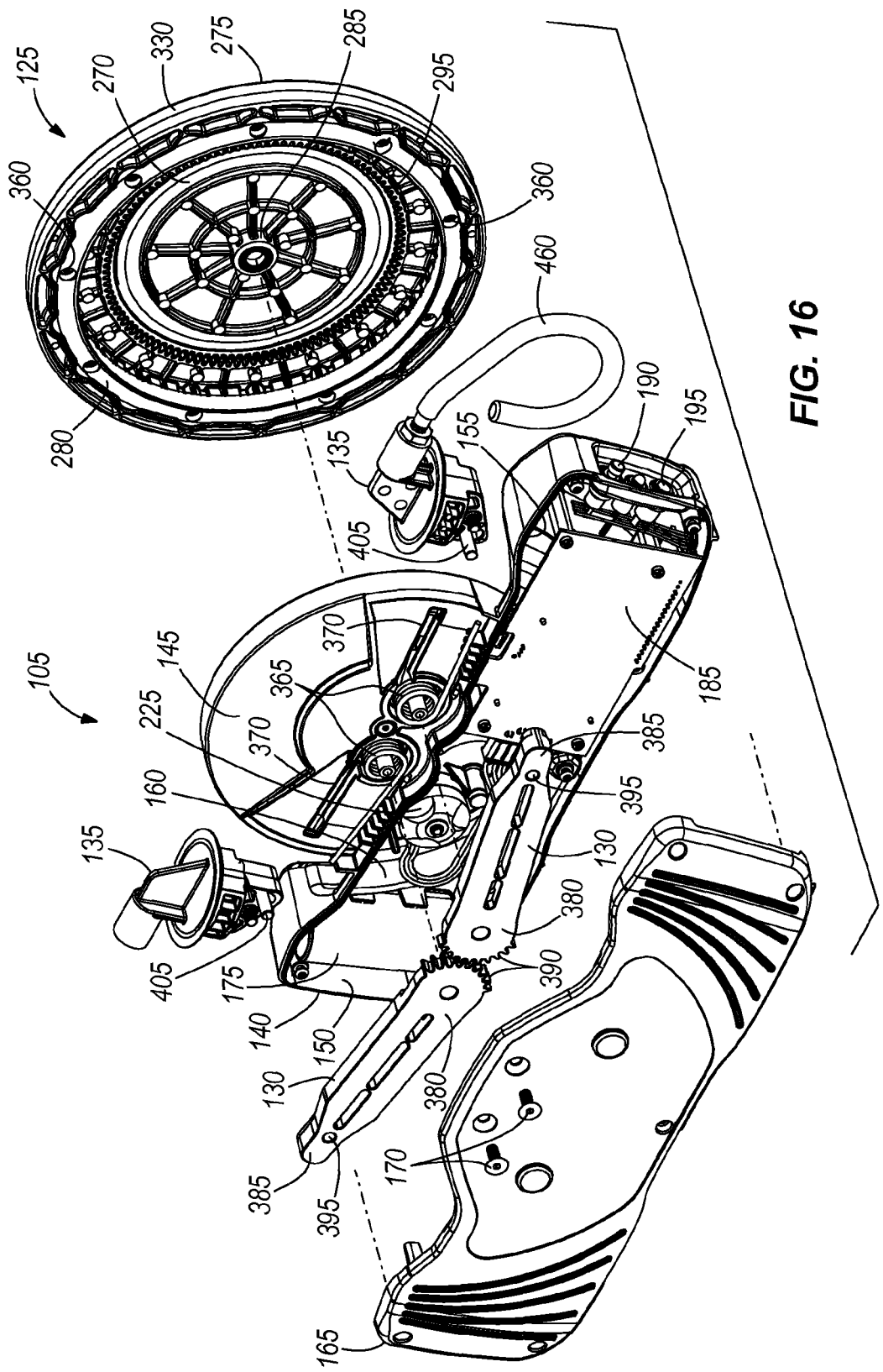
FIG. 16 is another exploded view of the drive unit of FIG. 8.

As shown in FIGS. 15-17, the second housing portion 145 supports the suspension arms 130, the wheel assembly 125, and a sensor 127. With reference to FIG. 17, the sensor 127 is coupled to the second housing portion 145 near a top middle area, and is in electrical communication with the first controller 185. As illustrated, the sensor 127 is a Hall effect sensor that detects the presence of magnetic fields generated by the track markers 75 during operation of the cleaning device 10. Depending on the polarity detected by the sensor 127, the cleaning device 10 will start, stop, accelerate, or slow down. Alternatively, other suitable sensors (e.g., infrared technology, RFID sensors, etc.) can be coupled to the second housing portion 145 for detecting the track markers 75. In some constructions, the sensor 127 can be slidably coupled to the second housing portion 145 so that the position of the sensor 127 can be adjusted to match the distance that the track markers 75 are suspended below the track 55.

FIGS. 1, 8-17, and 20 show that the wheel assembly 125 is coupled to the second housing portion 145 by a fastener 265. As shown in FIGS. 16, 17, and 20-22, the wheel assembly 125 includes a wheel 270, a tire 275, and a retainer 280 that attaches the tire 275 to the wheel 270. As illustrated, the wheel 270 is a single wheel that defines a central plane of the drive unit 105. The illustrated wheel 270 is positioned relative to the remaining components of the drive unit 105 so that the weight of the drive unit 105 is balanced about the wheel, although the wheel 270 can be offset from the center of gravity of the drive unit 105. The wheel 270 includes a hub 285 that is rotatably coupled to an axle 287 extending outward from the second housing portion 145, attachment portions 290 extending circumferentially around a periphery of the wheel 270, and an integrated wheel gear 295 that is formed concentrically between the hub 285 and the outer periphery. As shown in FIG. 20, the wheel 270 also includes a tire engagement portion 300 that has a lip or edge 305. The wheel 270 can be formed from any suitable material (e.g., a metal such as steel, magnesium, or aluminum, an alloy, composite, etc.) that provides adequate strength and rigidity for connecting the wheel assembly 125 to the second housing portion 145 and for engaging the cleaning device 10 with the conveyor system 15.

FIGS. 20-24 show that the tire 275 is defined by a hollow ring that is coupled to the outer periphery of the wheel 270. The tire 275 is formed from rubber or another similar material (e.g., urethane, santoprene, etc.) that has a predetermined hardness (e.g., less than 70 on the durometer scale) to provide adequate wet traction for the tire 275 on the track walls 40.

Figure 23:
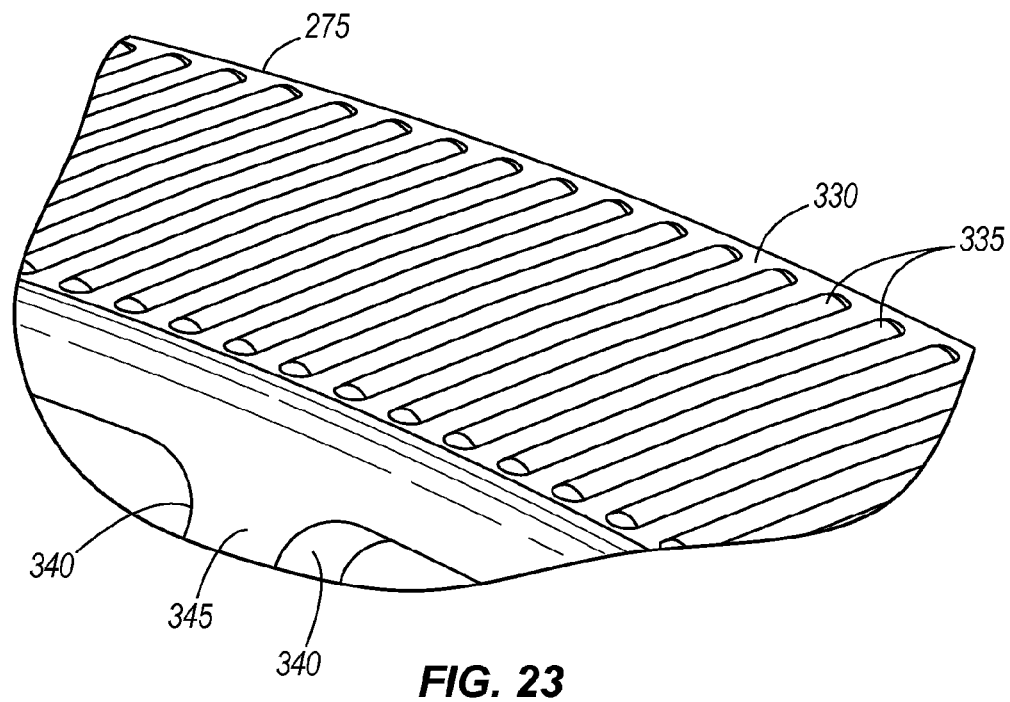
FIG. 23 is a perspective view of a portion of the tire of FIG. 22.
Figure 24:
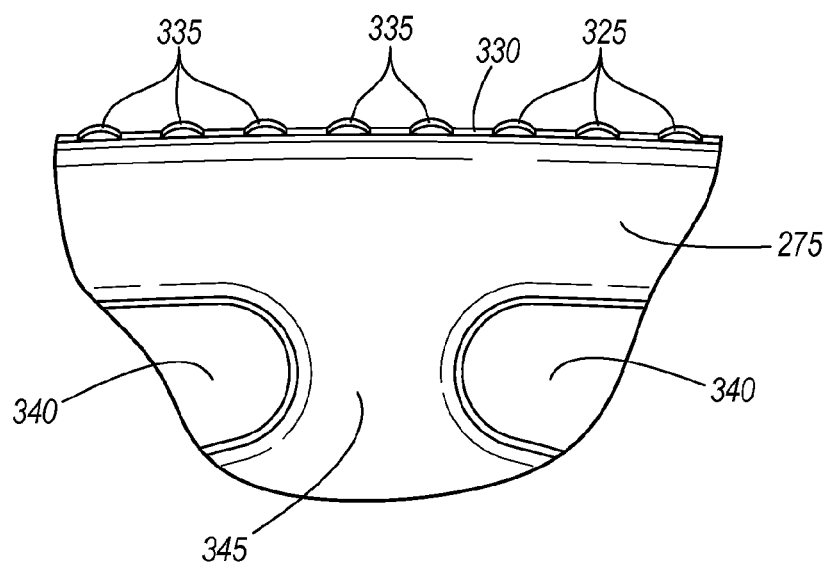
FIG. 24 is a side view of a portion of the tire of FIG. 22.
Figure 30:
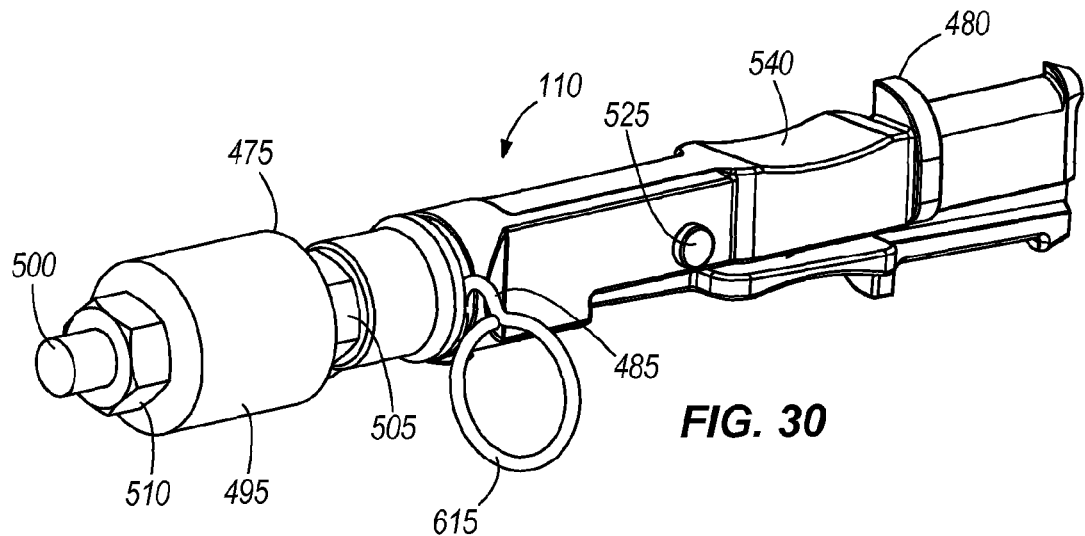
FIG. 30 is a perspective view of an attachment mechanism of the cleaning device of FIG. 1.
Figure 31:
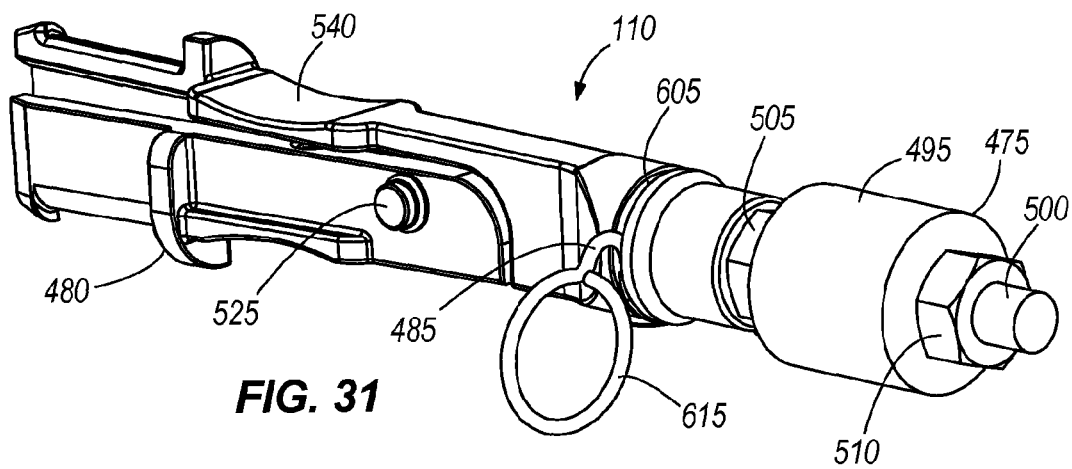
FIG. 31 is another perspective view of the attachment mechanism.
Figure 32:
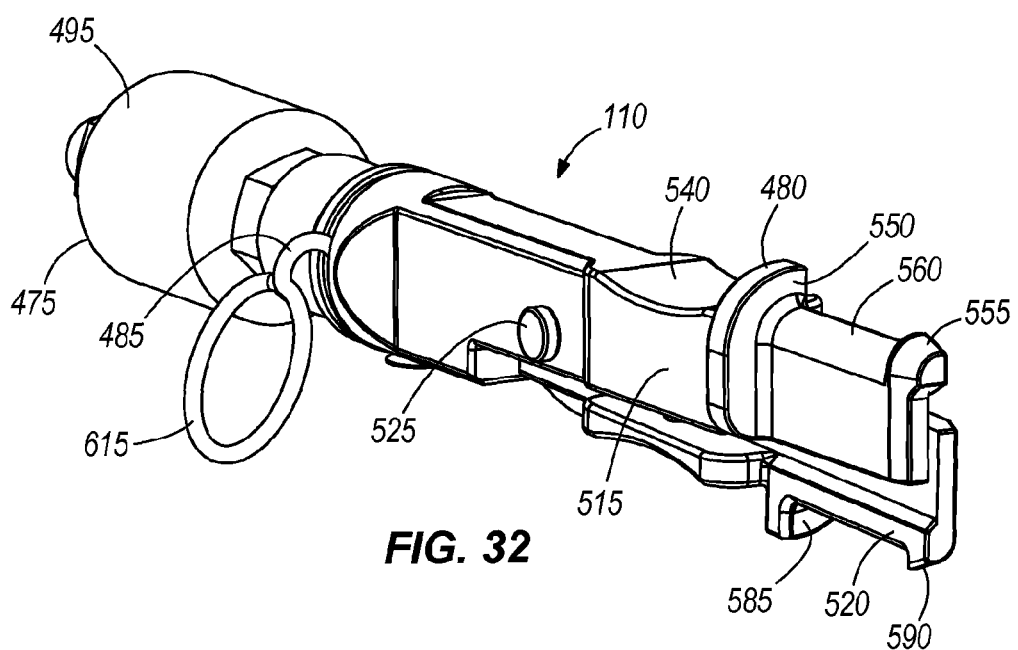
FIG. 32 is another perspective view of the attachment mechanism.
Figure 33:
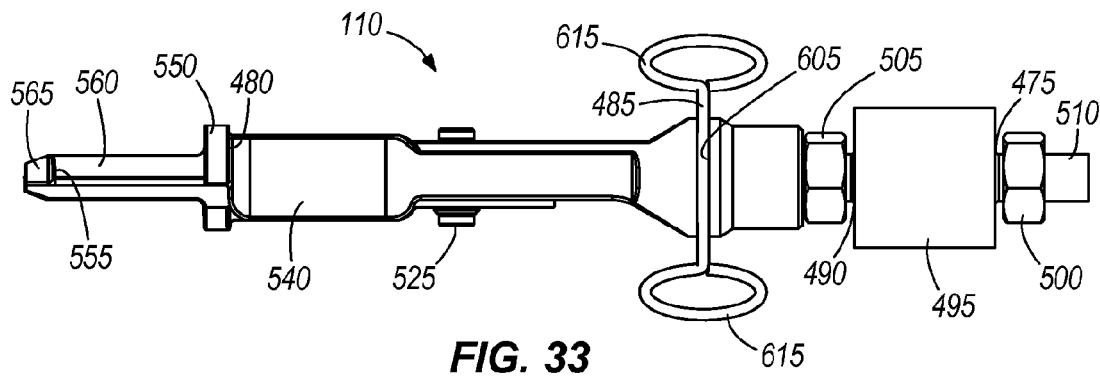
FIG. 33 is a top view of the attachment mechanism.

As illustrated, the tire 275 includes a projection 310 that is located on an inner periphery of the tire 275, a conveyor engagement portion 315 located on an outer periphery of the tire 275, and a central wall 320 that interconnects the projection 310 and the conveyor engagement portion 315. The projection 310 cooperates with the edge 305 of the tire engagement portion 300 to securely attach the tire 275 to the wheel 270. The conveyor engagement portion 315 has a tire surface 330 that is engageable with the track walls 40 to facilitate movement of the cleaning device 10 in the conveyor. As illustrated in FIGS. 23 and 24, the tire surface 330 can have tread 335 (e.g., ribs) that extends across the tire surface 330 transverse to the direction of travel of the tire 275 so that the tire 275 has increased traction in wet conditions, which are typical in conveyor systems.

The central wall 320 cooperates with the wheel engagement portion and the conveyor engagement portion 315 to define a plurality of recesses 340 extending circumferentially around the tire 275 adjacent the outer periphery. The recesses 340 are separated from each other by recess walls 345. The central wall 320 and the recess walls 345 provide rigidity or stiffness to the tire 275, and the recesses 340 (i.e., the areas between the recess walls 345 along the perimeter of the tire 275) provide compliance or flexibility to the tire 275 for shock absorption as the cleaning device 10 moves along the track 55.

As illustrated in FIG. 20, the retainer 280 has a lip or edge 350 that cooperates with the tire engagement portion 300 to form a rim for receiving the tire 275. The retainer 280 includes fastener holes 355 that align with the attachment portions 290 and that receive fasteners 360 for attaching the tire 275 to the wheel 270.

The illustrated wheel assembly 125 has a single wheel 270 and tire 275 for engaging the track walls 40. In other constructions, the wheel assembly 125 can include two or more wheels 270 and corresponding tires 275 for driving the cleaning device 10 along the track 55. Additional wheels 270 and tires 275 can be powered by the motor 225 or a different dedicated motor. Also, one or more of the additional wheels 270 can be an idler wheel.

The suspension arms 130 extend outward toward the forward and rearward ends 95, 100 of the cleaning device 10 from a center of the second housing portion 145. With reference to FIGS. 11, 12, and 15-17, torsion springs 365 are coupled to the second housing portion 145 within spring engagement recesses 370 and to the suspension arms 130 within spring grooves 375 to bias the suspension arms 130 downward as viewed in FIGS. 11 and 12 so that the tire 275 is compressed against the track walls 40. The illustrated springs 365 have a spring rate that is at least 0.20 to provide adequate force for engaging the wheel assembly 125 with the track walls 40, although other spring rates for the springs 365 are possible and considered herein. Alternatively, other types of springs can be coupled between the second housing portion 145 and the suspension arms 130 to bias the wheel 270 into engagement with the track walls 40.

FIGS. 15-19 show that each suspension arm 130 is an elongated member that includes a first end 380 and a distal second end 385. The first end 380 is pivotably coupled to the second housing portion 145 by pins that extend outward from the second housing portion 145. The first end 380 defines a gear portion 390 along the perimeter of the first end 380. When the suspension arms 130 are coupled to the second housing portion 145, the gear portions 390 are engaged with each other so that movement of one suspension arm 130 causes corresponding movement of the other suspension arm 130.

The second end 385 of each suspension arm 130 includes a first pin hole 395 and a second pin hole 400. In the illustrated construction, the first pin hole 395 has a smooth bore and the second pin hole 400 has a threaded bore. A pivot pin 405 is fixed to (e.g., press fit) each suspension arm 130 within the first hole 395 to permit pivotal movement of the glides 135. In other constructions, the pivot pins 405 can be removably coupled to the suspension arms 130 or integrally formed with the suspension arms 130.

FIGS. 1 and 8-15 show that the glides 135 are pivotably coupled to the second ends 385 of the suspension arms 130. The glide 135 can be formed from any suitable material (e.g., metal, alloy, composite, plastic, etc.). As shown in FIGS. 25-28, the glide 135 defines a slot 410 and a hole 415 adjacent the bottom of glide 135 (as viewed in FIG. 26), and the glide 135 is coupled to the suspension arm 130 so that the pivot pin 405 is disposed in the slot 410. A connector pin 420 (e.g., shoulder screw, quick release pin, etc.) extends through the hole 415 in the glide 135 and is engageable (e.g., threadable) with the second pin hole 400 to securely attach the glide 135 suspension arm 130. The glide 135 is pivotable about the connector pin 420 relative to the suspension arm 130 a distance corresponding to the length of the slot 410.

The glide 135 includes an alignment key or flange 425 near the middle of the glide 135, and a fastener portion 430 adjacent the top of the glide 135. As illustrated, the flange 425 is shaped to closely match the neck finish on bottles that are distributed through the conveyor system 15 so that the cleaning device 10 is substantially centered in the slotted track 55. With reference to FIG. 27, the flange 425 is circular and defines a diameter substantially corresponding to the diameter of the bottles to avoid interference with other components of the conveyor system 15. With reference to FIGS. 26 and 28, the flange 425 includes a first engagement surface 435 and a second engagement surface 440 that is wider than the first engagement surface 435. The second engagement surface 440 is further tapered from the first engagement surface 435 toward the perimeter of the flange 425. As illustrated in FIG. 25, the fastener portion 430 is connected to the flange 425 by a thin wall 445, and includes an insert 450 that has a fastener hole 455.

Figure 62:
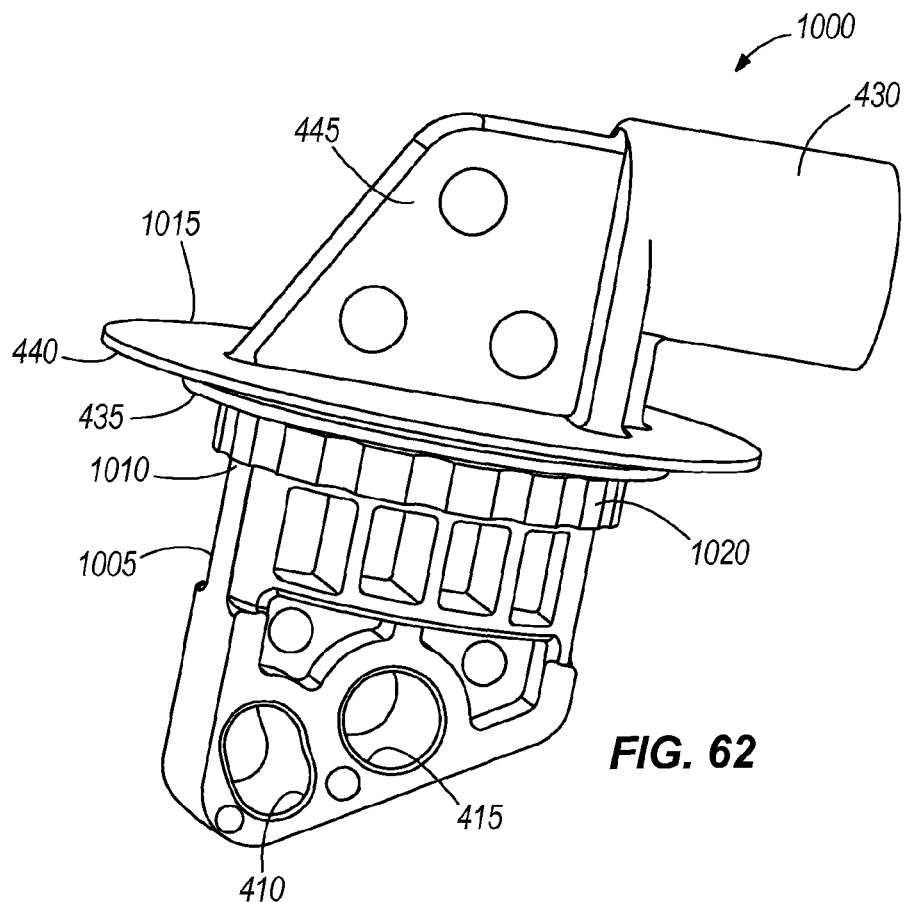
FIG. 62 is a perspective view of another glide for the drive unit of FIG. 8.
Figure 63:
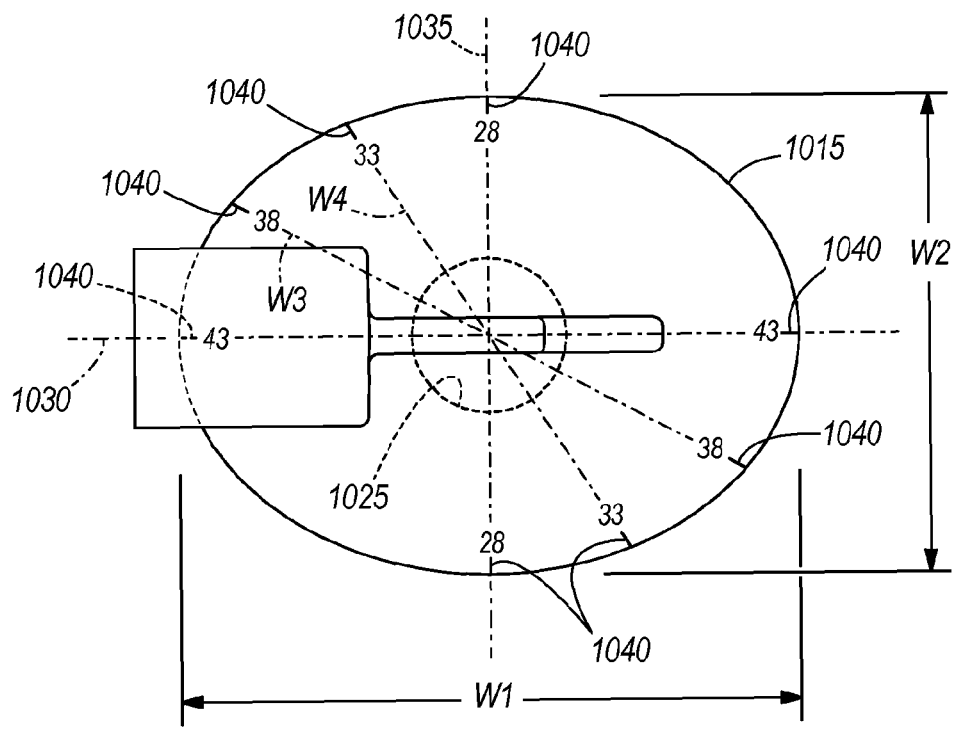
FIG. 63 is a top view of the glide of FIG. 62.

FIGS. 62 and 63 show another glide 1000 for use with the drive unit 105. Except as described below, the glide 1000 is the same as the glides 135 described with regard to FIGS. 1 and 8-27, and like elements are given the same reference numerals.

With reference to FIG. 62, the glide 1000 includes the fastener portion 430, a glide body 1005, and a threaded body portion 1010 near the middle of the glide 1000 on a lower end of the fastener portion 430. An alignment key or flange or glide ring 1015 is rotatably engaged with the glide 1000 adjacent the threaded portion 1010 (i.e., above the threaded body portion 1010 as viewed in FIG. 62), and a lock nut 1020 threadably engages the threaded body portion 1010 to hold the glide ring 1015 in a desired orientation on the glide body 1005.

With continued reference to FIGS. 62 and 63, the glide ring 1015 has the first and second engagement surfaces 435, 440 and a central hole 1025 so that the glide ring 1015 can be received on the glide body 1005. Generally, the glide ring 1015 is shaped to closely match the neck finish on bottles that are distributed through the conveyor system 15 so that the cleaning device 10 is substantially centered in a slotted track (e.g., the slotted track 55). As illustrated in FIG. 63, the glide ring 1015 has a generally oval shape (when viewed from above or below) so that the drive unit 105 can be used on several different-sized tracks accommodating corresponding bottle neck sizes. As will be appreciated, the ovular glide ring 1015 has a major axis 1030 that defines a first diameter or width W1 of the glide ring 1015 substantially corresponding to the size of relatively large-necked bottles that pass through a similarly-sized track. The ovular glide ring 1015 also has a minor axis 1035 that defines a smaller second diameter or width W2 of the glide ring 1015 substantially corresponding to the size of relatively small-necked bottles that pass through a similarly-sized slotted track.

Due to the ovular shape of the glide ring 1015, the glide 1000 also can be used with tracks accommodating bottle necks with diameters or widths that are smaller than the first width and larger than the second width. For example, FIG. 63 shows that the glide ring 1015 is provided with four sets of alignment indicators 1040 (e.g., tick marks) to assist with identifying the location of the first width W1, the second width W2, as well as a third width W3 and a fourth width W4 that fall between the first width W1 and the second width W2. Each of these widths W1-W4 is sized to correspond with the width of a slotted track (e.g., 28 millimeters, 33 millimeters, 38 millimeters, 43 millimeters, etc.). While the glide ring 1015 visually identifies four widths W1-W4, the width of the oblong glide ring 1015 can be smoothly varied between the first width W1 and the second width W2 to accommodate the width of any number of slotted tracks.

As desired, additional or fewer alignment indicators 1040 can be provided on the glide ring 1015 to identify the corresponding width(s). Also, while the alignment indicators 1040 provide a visual reference for properly aligning the glide 1000 in a slotted track to be cleaned, it should be appreciated that the alignment indicators 1040 are optional. Furthermore, while the illustrated glide ring 1015 has an oval shape, other shapes (e.g., rectangle, square, triangle, other oblong shapes, etc.) for the glide ring 1015 that universally accommodate different-sized slotted tracks are possible and considered herein.

The adjustable glide 1000 can be assembled by placing the glide ring 1015 on the lower end of the fastener portion 430. The glide body 1005 can then be attached (e.g., welded, detachably coupled, etc.) to the fastener portion 430. As illustrated, the glide body 1005 is ultrasonically welded to the fastener portion 430, although other options for forming the adjustable glide 1000 are possible and considered herein.

To fit the glide 1000 for a slotted track to be cleaned, the lock nut 1020 is loosened so the glide ring 1015 can be moved relative to the glide body 1005. With the lock nut 1020 thus loosened, the glide ring 1015 is rotated around the glide body 1005 until an appropriate width (e.g., one of the widths W1-W4 or another width) has been found that is compatible with or substantially the same as the width of the slotted track to be cleaned. Although not necessary for cleaning the track, the alignment indicators 1040 can be used to assist with determining whether the glide ring 1015 is properly aligned for the slotted track to be cleaned before the drive unit 105 is placed in the track. While the illustrated glide ring 1015 is preferably rotated clockwise to increase the useful width of the glide 1000 from the second width W2 and rotated counter-clockwise to decrease the useful width from the first width W1 (based on the orientation of the alignment indicators 1040 on the glide ring 1015), it should be understood that the glide ring 1015 can be rotated clockwise or counterclockwise to increase or decrease the useful width for the glide 1000. When the appropriate width for the glide ring 1015 has been selected, the lock nut 1020 is tightened so that the glide ring 1015 does not rotate during operation of the drive unit 105 within the track.

With reference to FIGS. 1, and 8-17, the cleaning device 10 includes a hook 460 that is detachably coupled to the glide 135 adjacent the rearward end 100 of the cleaning device 10. As shown in FIG. 29, the hook 460 a fastener end 465 that can be threadably coupled to the glide 135 within the fastener hole 355. A nut 470 is coupled to the fastener end 465 to hold the hook 460 in engagement with the glide 135, 1000. In other constructions, the hook 460 can be coupled to the glide 135, 1000 via a pin connection or other suitable attachment means.

In some constructions, the cleaning device 10 can be provided with a non-motorized drive unit 105. Generally, the non-motorized cleaning device 10 is a streamlined version of the motorized cleaning device 10 described with regard to FIGS. 1 and 8-29. Manual power is used instead of the motor 225 to move the non-motorized cleaning device. In particular, a line (not shown) can be attached to the hook 460 or another hook coupled to the bottom of the control housing 120 (e.g., near the center of the control housing 120) so that an operator can move the non-motorized cleaning device along the track 55 from below the conveyor system 15. In the non-motorized construction, the drive unit 105 can be further provided without one or more of the LCD screen 180, the power source 175, the LEDs 200, 205, 210, and the first and second controllers 185, 220.

With reference to FIG. 1, the attachment mechanism 110 is coupled to the glide 135, 1000 adjacent the forward end 95 of the cleaning device 10. FIGS. 30-37 show that the attachment mechanism 110 is defined by an elongated body that fits within the product passageway 65 of the air conveyor 20 without interfering with components of the air conveyor 20.

The attachment mechanism 110 includes a glide attachment portion 475 adjacent a first end, an implement attachment portion 480 adjacent a second end, and a stabilizer 485 between the first end and the second end and offset from the center of the attachment mechanism 110. The glide attachment portion 475 has a first fastener 490 (e.g., threaded stud) that is coupled to the first end, a flexible member 495 coupled to a distal end of the first fastener 490, and a second fastener 500 (e.g., threaded stud) coupled to and extending axially outward from the flexible member 495. The flexible member 495 can be formed from any suitable flexible material (e.g., rubber, composite, etc.). The second fastener 500 is attachable to (e.g., threadably engageable with) the glide 135, 1000 within the fastener hole 355. As illustrated, a first nut 505 is threadably engaged with the first fastener 490 to inhibit loosening of the fastener 490 from the first end. A second nut 510 is threadably engaged with the second fastener 500 to inhibit loosening of the glide attachment portion 475 from the glide 135, 1000. In other constructions, the glide attachment portion 475 can be connected to the first end of the attachment mechanism 110 and the glide 135, 1000 by other suitable attachment means (e.g., pin connection, etc.).

As shown in FIGS. 30-37, the implement attachment portion 480 is a scissors-like device that is engageable with the cleaning implement 115 to support the cleaning implement 115 at the forward end 95 of the cleaning device 10. The implement attachment portion 480 includes a first scissor arm 515 that is integrally formed with the body of the attachment mechanism 110, and a second scissor arm 520 that is pivotably coupled to the first scissor arm 515 by a pin 525. With reference to FIG. 37, a spring 530 is engaged with the first scissor arm 515 and the second scissor arm 520 within corresponding spring recesses (not shown) to bias the second scissor arm 520 away from the first scissor arm 515. The pin 525 is proximate an inner end of the second scissor arm 520 and the spring 530 is spaced apart from the pin 525 so that the second scissor arm 520 can be moved relative to the first scissor arm 515.

The first scissor arm 515 is defined by a chamfered inner edge 535 and includes a first surface 540 engageable by an operator and a first grommet attachment portion adjacent the first surface 540. The first grommet attachment portion is defined by a narrow cross-section and has a first wall 550, a first hook member 555 located adjacent the second end, and a first grommet support 560 extending between the first wall 550 and the first hook member 555. With reference to FIGS. 36 and 37, the first hook member 555 defines an acute angle relative to the first grommet support 560 and has a tapered end portion 565.

The second scissor arm 520 is defined by a chamfered inner edge 570 and includes a second surface 575 engageable by an operator and a second grommet attachment portion adjacent the second surface 575. The second grommet attachment portion is defined by a narrow cross-section and has a second wall 585, a second hook member 590 located adjacent the second end, and a second grommet support 595 extending between the second wall 585 and the second hook member 590. With reference to FIGS. 36 and 37, the second hook member 590 defines an acute angle relative to the second grommet support 595 and has a tapered end portion 600.

Figure 34:
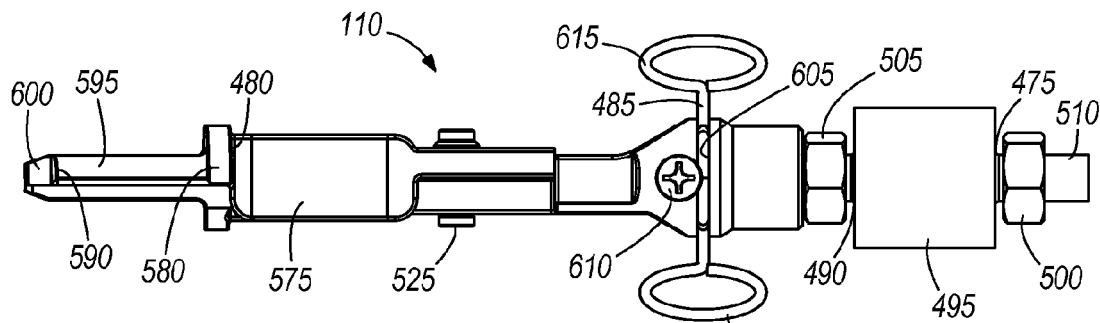
FIG. 34 is a bottom view of the attachment mechanism.
Figure 35:
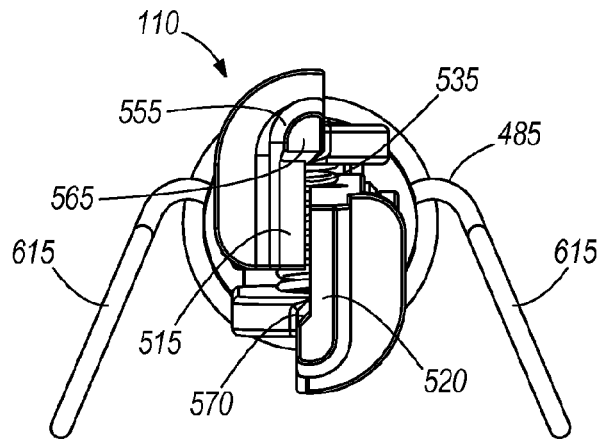
FIG. 35 is an end view of the attachment mechanism.

As shown in FIGS. 30-34, 36, and 37, the stabilizer 485 is coupled to the attachment mechanism 110 within a channel 605 that is closer to the first end in the second end. As shown in FIG. 34, the stabilizer 485 is immovably secured to the attachment mechanism 110 by a fastener 610. As illustrated, the stabilizer 485 is a wireform lead guide that is engaged with the channel 605 and that has opposed track engagement portions 615 that support the attachment mechanism 110 on the track 55. The illustrated track engagement portions 615 are substantially circular, although other shapes are possible and considered herein.

Figure 38:
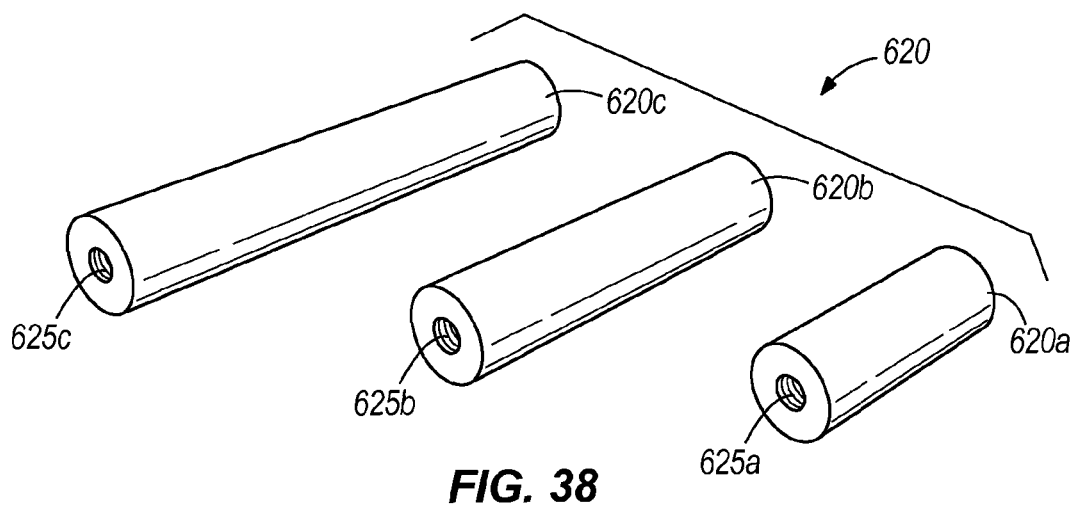
FIG. 38 is a perspective view of a plurality of extensions for the attachment mechanism.
Figure 39:
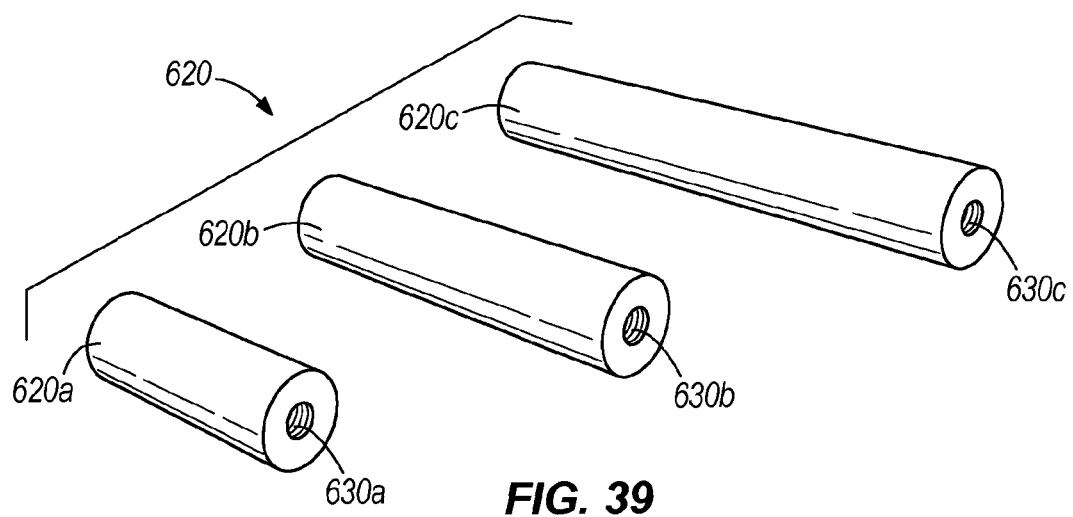
FIG. 39 is another perspective view of the plurality of extensions for the attachment mechanism.

FIGS. 38 and 39 show three extensions 620 that can be selectively coupled to one or both of the first fastener 490 and the second fastener 500 to lengthen the attachment mechanism 110 based on the characteristics of the conveyor system 15 on which the cleaning device 10 will be used (e.g., radius of bends in the track 55, obstructions adjacent the end of the track 55, etc.). One or more of the extensions 620 can be used based on the conveyor system characteristics. Each of the extensions 620a, 620b, 620c includes a first fastener hole 625a, 625b, 625c adjacent one end, and a second fastener hole 630a, 630b, 630c adjacent the other end. Depending on the orientation of the extension 620a, 620b, 620c relative to the glide attachment portion 475 (e.g., between the elongated body and the glide attachment portion 475, or coupled to and extending outward from the second fastener), the first and second fastener holes 625, 630 are engageable by the first fastener 490 or the second fastener 500 and another threaded fastener (not shown) that can be coupled to either the first end of the attachment mechanism 110 or the glide 135, 1000. The illustrated first extension 620a is approximately 1.5 inches long, the second extension 620b is approximately 2.5 inches long, and the third extension 620c is approximately 2.5 inches long. Extensions having other lengths can be coupled to the attachment mechanism 110 to provide the appropriate length for the attachment mechanism 110 based on the characteristics of the conveyor system 15.

Figure 40:
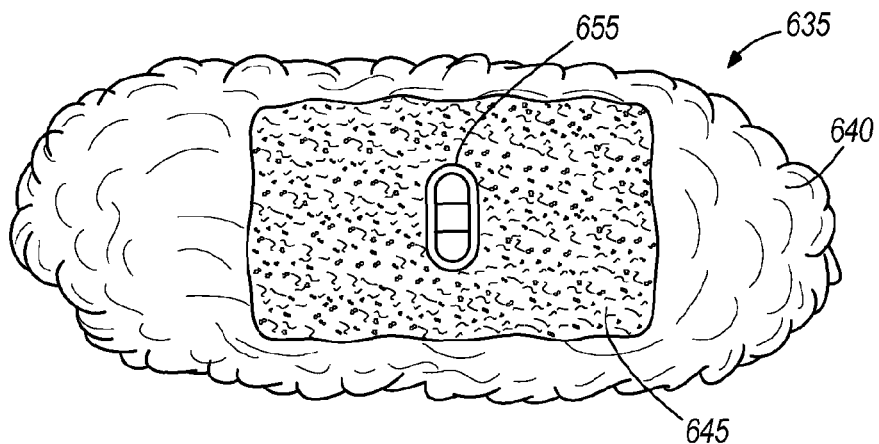
FIG. 40 is an end view of a cleaning head of the cleaning device including cleaning pads and a grommet.
Figure 41:
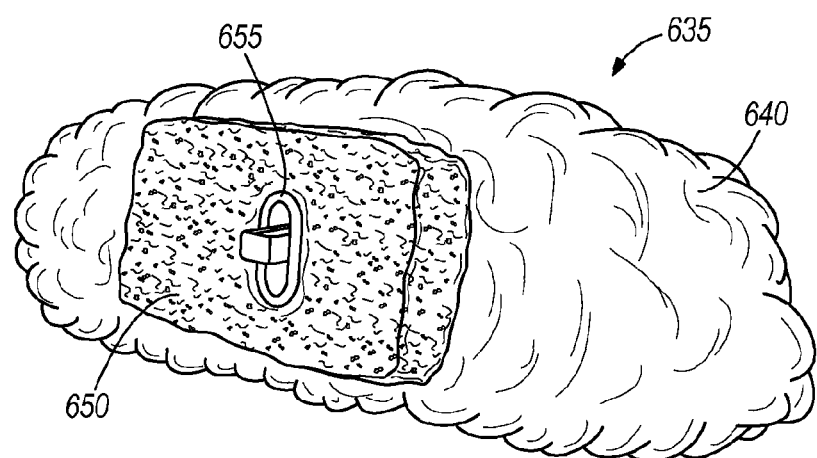
FIG. 41 is a rear perspective view of the cleaning head of FIG. 40.
Figure 42:
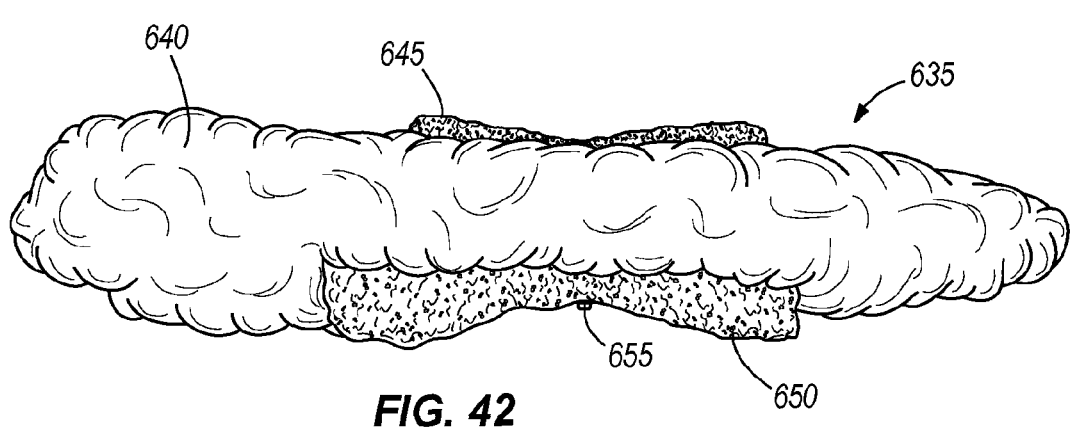
FIG. 42 is a top view of the cleaning head of FIG. 40.

FIGS. 40-42 show that the cleaning implement 115 includes a pad assembly 635 that has a first pad 640, a second pad 645, and a third pad 650, and a grommet 655 attaching the first, second, and third pads 640, 645, 650 to each other. The pad assembly 635 can include fewer or more than three pads 640, 645, 650. The first, second, and third pads 640, 645, 650 are flexible and can bend or change shape to at least partially engage the track 55 regardless of the track 55 profile. Generally, the first pad 640, the second pad 645, and the third pad 650 can have any shape that is suitable for cleaning the track 55.

As illustrated, the first pad 640 is wider than the second and third pads 645, 650, and is formed from duster material (e.g., feather-like). As illustrated, the first pad 640 is formed from two pieces of duster material each having pad backing (not shown). The pad backings are adhered to each other, and an oval-shaped hole 660 is formed in the center of the first pad 640 by a suitable manufacturing process (e.g., die-cut, punch, etc.). With reference to FIGS. 43 and 44, the hole 415 is formed in conjunction with (e.g., concurrently or consecutively) a weld process so that the fibers of the first pad 640 do not fray, shed, or otherwise interfere with cleaning the track. In particular, the weld process applies a welding stripe or sonic weld 665 (e.g., formed by at least partially melting some of the material of the first pad 640) along a longitudinal centerline of the first pad 640 to secure the pad fibers to the pad backing (not shown). FIG. 43 shows one half of the first pad 640 with the sonic weld 665.

The second pad 645 and the third pad 650 are positioned on either side of the first pad 640, and are formed from a material (e.g., needle punch material) that is more abrasive than the duster material of the first pad 640 to scrape debris from the track. In other constructions, one or both of the second pad 645 and the third pad 650 can be formed from material that is less abrasive than the duster material of the first pad 640. Oval-shaped holes 670 are formed in the center of the second pad 645 and the third pad 650 by a suitable manufacturing process (e.g., die-cut, punch, etc.). The second pad 645 and the third pad 650 can have the same or different dimensions relative to the first pad 640.

With reference to FIGS. 43-45, the grommet 655 is coupled to the pad assembly 635 within the holes 660, 670 to attach the cleaning implement 115 to the drive unit 105 by engagement of the attachment mechanism 110 with the grommet 655. The grommet 655 can be formed from any suitable material (e.g., metal, alloy, composite, plastic, etc.). FIGS. 46-49 show that the grommet 655 is oval-shaped to conform to the holes 660, 670 formed in the pad assembly 635, and includes a first grommet portion 675 and a second grommet portion 680 that is coupled to the first grommet portion 675.

Figure 46:
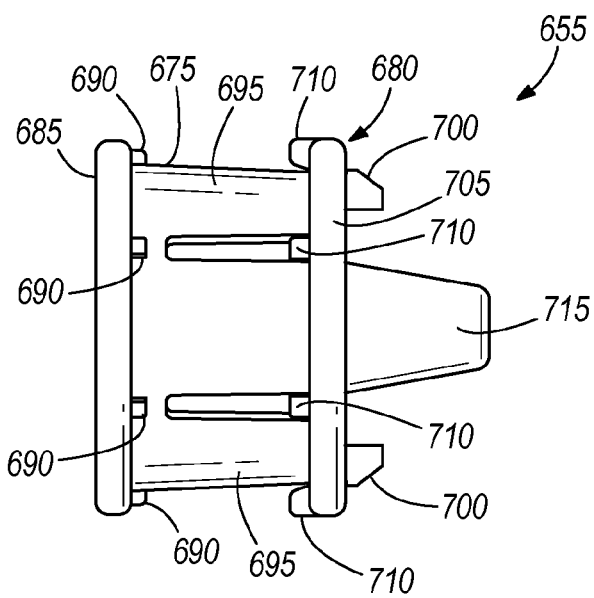
FIG. 46 is a side view of the grommet of FIG. 40 including a first grommet portion and a second grommet portion.
Figure 47:
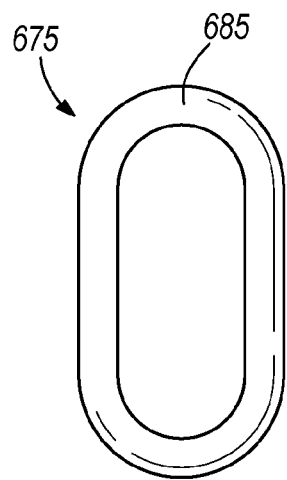
FIG. 47 is an end view of the first grommet portion of FIG. 46.
Figure 48:
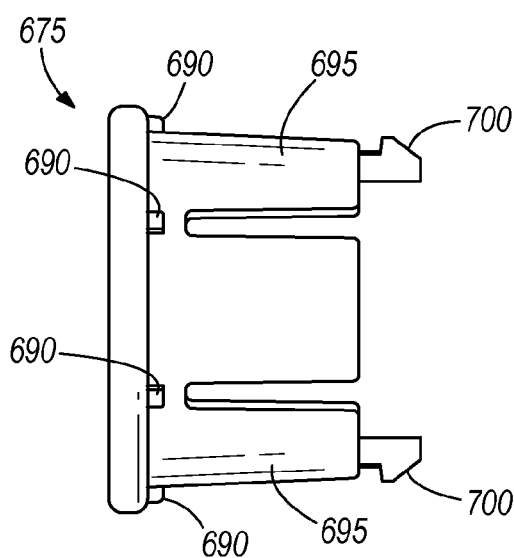
FIG. 48 is a side view of the first grommet portion.

With reference to FIGS. 46-48, the first grommet portion 675 is defined by an elongated body that has a first rim 685 adjacent one end of the elongated body, protrusions 690 extending from the first rim 685 toward the second grommet portion 680, and flexible arms 695. The flexible arms 695 are on opposite sides (the top and bottom of the first, portion as illustrated in FIG. 48) of the first grommet portion 675 and are engageable by the first and second grommet supports 560, 595. As illustrated in FIG. 48, the flexible arms 695 include tapered distal ends 700 that define hook-like members and that are engageable with the second grommet portion 680. The flexible arms 695 are formed to have a predetermined stiffness that provides rigidity to the first grommet portion 675 while allowing for some deflection of the tapered distal ends 700 in response to a force acting on the tapered distal ends 700.

Figure 49:
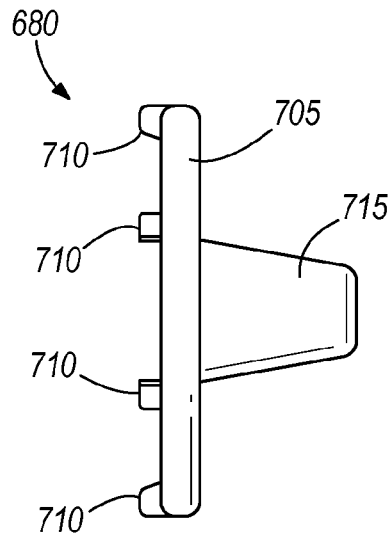
FIG. 49 is a side view of the second grommet portion of FIG. 46.
Figure 50:
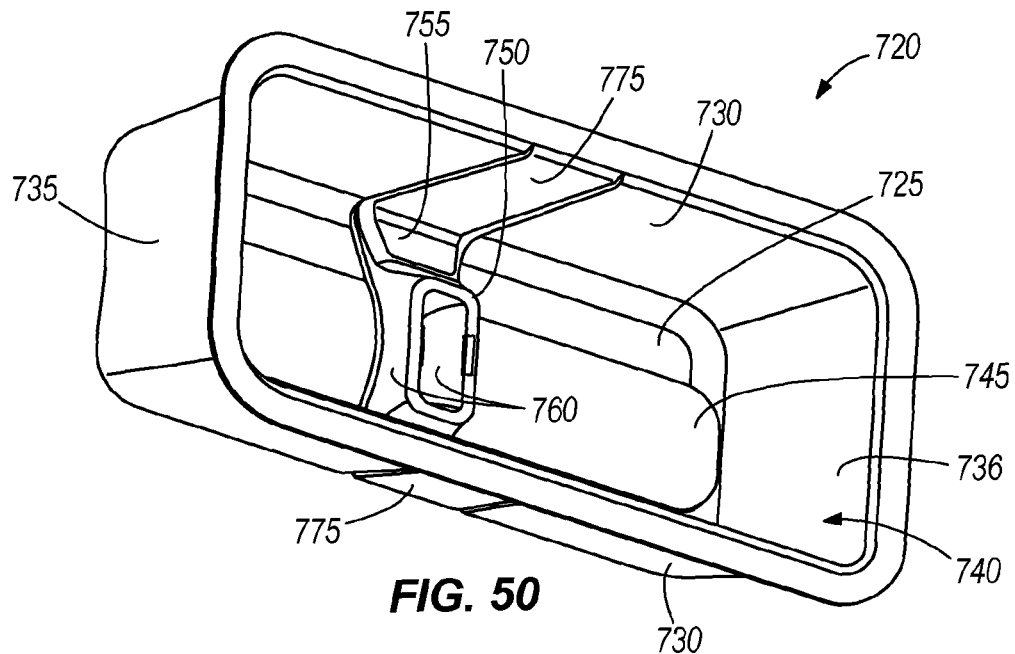
FIG. 50 is a perspective view of a package for the cleaning head.
Figure 51:
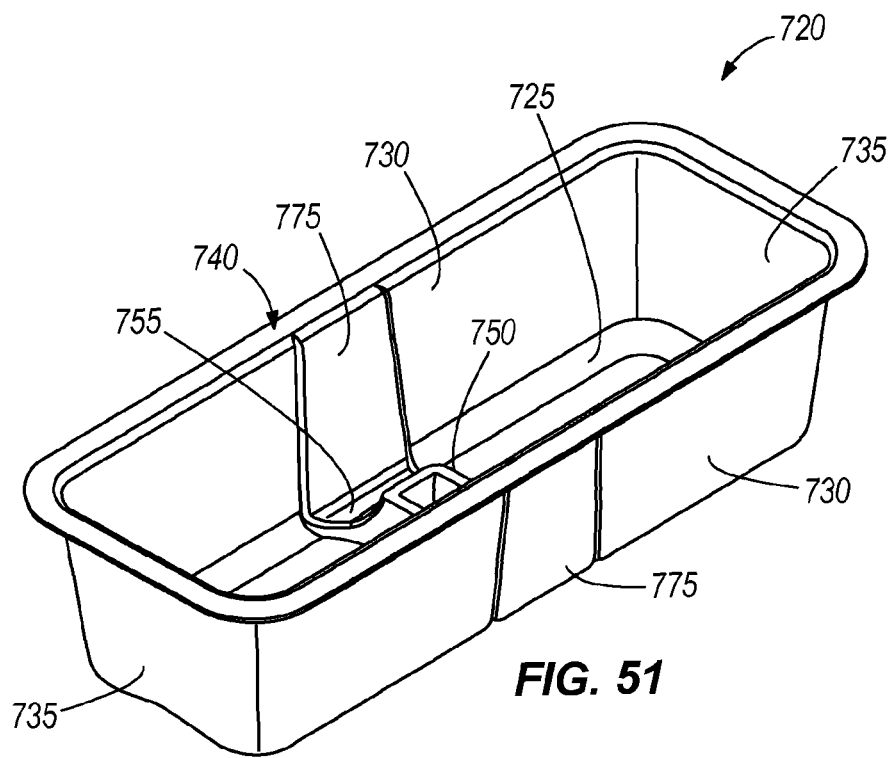
FIG. 51 is another perspective view of the package of FIG. 50.
Figure 52:
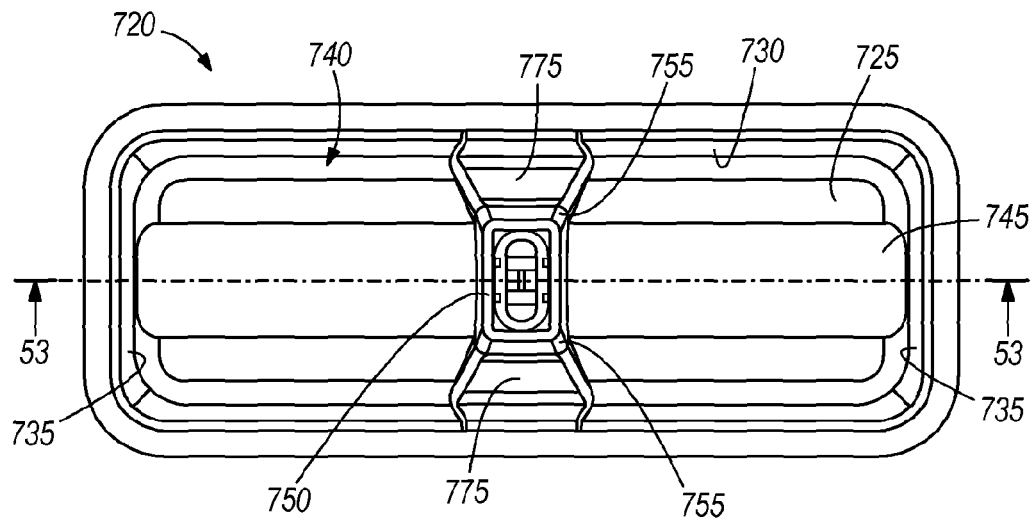
FIG. 52 is a top view of the package of FIG. 50.
Figure 53:
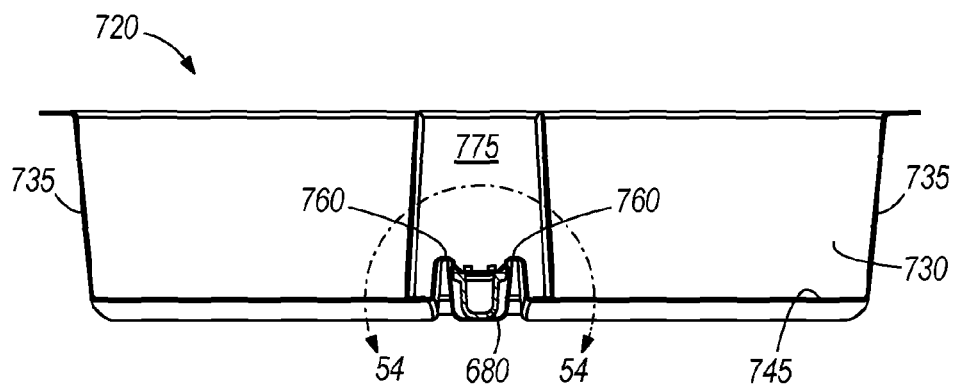
FIG. 53 is a section view of the package of FIG. 52 taken along line 53-53.

The second grommet portion 680 includes a second rim 705, protrusions 710 that extend from the second rim 705 toward the first rim 685, and a connector 715 that interconnects opposite sides of the second rim 705 to provide stiffening for the second grommet portion 680. With reference to FIGS. 41 and 49, the connector 715 defines a recess or channel that accommodates the second end of the attachment mechanism 110. The second rim 705 is engageable by the distal ends 700 of the flexible arms 695 on a side of the second rim 705 that is opposite the protrusions 710 to hold the first grommet portion 675 and the second grommet portion 680 together. The protrusions 690, 710 on the first grommet portion 675 and the second grommet portion 680 cooperate with the first rim 685 and the second rim 705 to engage the pad assembly 635 and resist removal of the pad assembly 635 from the grommet 655.

FIGS. 50-54 show a tray 720 in which the cleaning implement 115 is supported prior to use. The tray 720 is defined by a bottom wall 725, side walls 730, end walls 735, and an opening 740 to the tray 720 opposite the bottom wall 725. As shown in FIGS. 50 and 52-54, the bottom wall 725 is defined by raised wall portion 745 extending along the length of the tray 720.

Figure 54:
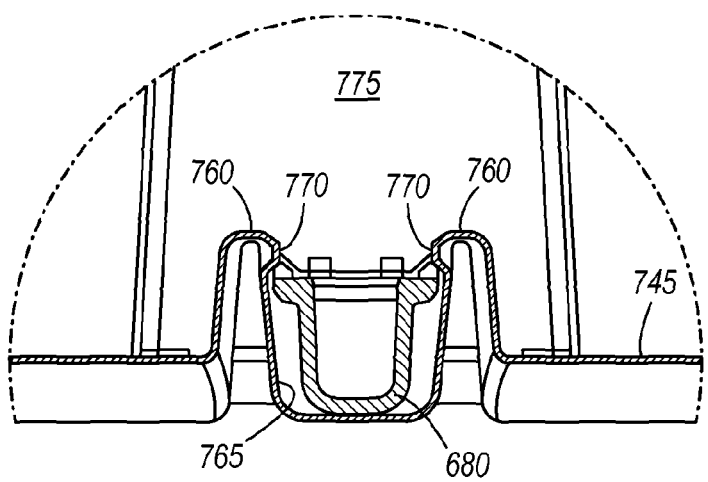
FIG. 54 is an enlarged view of a portion of the package of FIG. 53.

With reference to FIGS. 50-54, the tray 720 has a grommet recess 750 and a release mechanism 755 located at the center of the tray 720. The grommet recess 750 is defined by walls 760. As shown in FIG. 54, two opposed walls 760 have retainer portions or projections 770 near the top of the grommet recess 750. The retainer projections 770 extend into the grommet recess 750 toward each other such that the opening to the grommet recess 750 defined in part by the retainer projections 770 is smaller than the area directly below the retainer projections 770.

As shown in FIGS. 50 and 52-54, the release mechanism 755 extends across the tray 720 and adjoins and interconnects with the grommet recess 750. The release mechanism 755 is defined by recessed surfaces 775 on the exterior side of the bottom wall 725 and the side walls 730. Stated another way, the release mechanism 755 protrudes a relatively small amount into the area defined by the bottom wall 725, the side walls 730, and the end walls 735.

The cleaning implement 115 is assembled prior to being placed in the tray 720. With regard to the cleaning implement 115 illustrated in FIGS. 40-49, the holes 660, 670 is formed in the first pad 640, the second pad 645, and the third pad 650, and the pads 640, 645, 650 are then coupled together so that the holes 660, 670 in each pad are aligned with each other. The grommet 655 is coupled to the pad assembly 635 by inserting the first grommet portion 675 into the holes 660, 670 from one side, and inserting the second grommet portion 680 into the holes 660, 670 from the other side. The flexible arms 695 are pressed together slightly by some of the protrusions 710 on the second grommet portion 680 so that the tapered ends 700 fit through and then engage the second rim 705 on the second grommet portion 680.

Figure 55:
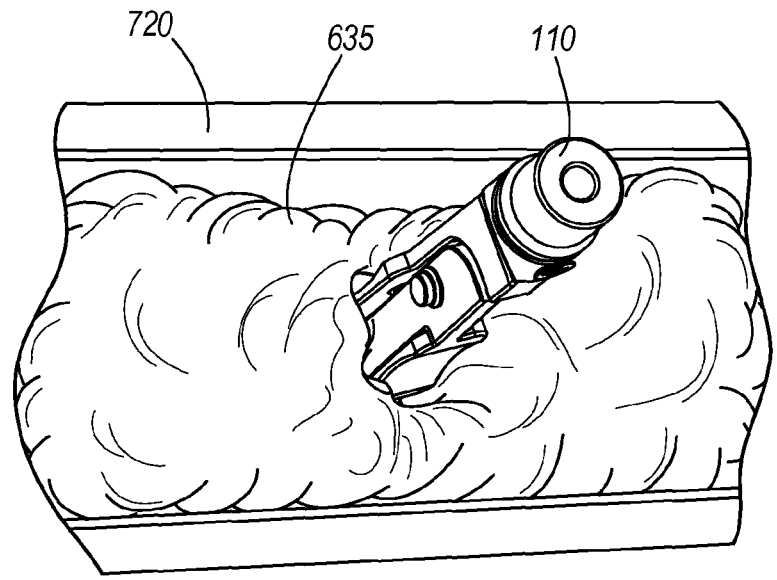
FIG. 55 is a perspective view of a portion of the cleaning device including the attachment mechanism, the cleaning head, and the package.
Figure 56:
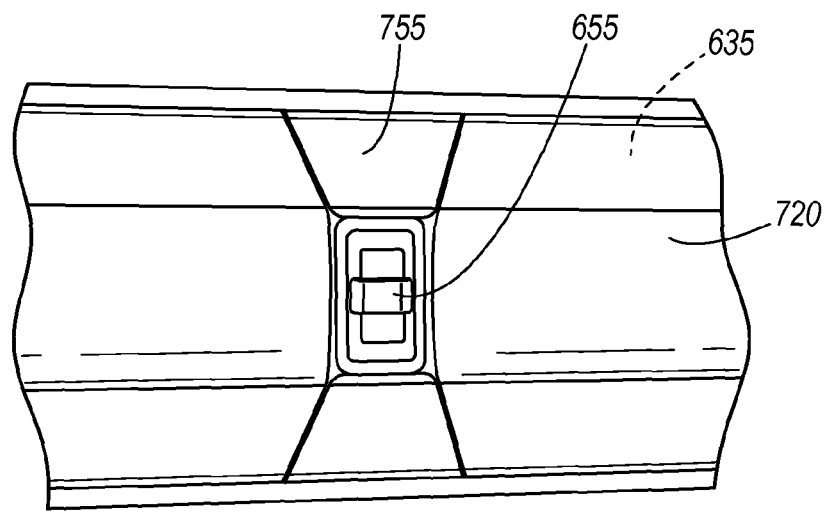
FIG. 56 is another perspective view of a portion of the cleaning device including the attachment mechanism, cleaning head, and the package.

With reference to FIGS. 54-56, the cleaning implement 115 is disposed in the tray 720 so that the grommet 655 is coupled to the grommet recess 750 within the grommet recess. The grommet 655 is pressed into the grommet recess so that the protrusions 710 on the second grommet portion 680 are in snap-fit engagement with the retainer projections 770. The retainer projections 770 lightly resist removal of the grommet 655 from the grommet 655 recess. A cleaning solution (e.g., an isopropyl-based solution, a water-alcohol mixture or surfactant, etc.) is applied to the pad assembly 635 after the cleaning implement 115 is coupled to the tray 720, and a seal (not shown) is applied to the rim to enclose the cleaning implement 115 in the tray 720. The grommet recess 750 allows an operator to open the packaged cleaning implement 115 and hold the tray 720 without touching the cleaning implement 115 and without the cleaning implement 115 undesirably falling out of the tray 720.

FIG. 55 shows the attachment mechanism 110 coupled to the cleaning implement 115. The attachment mechanism 110 is inserted into the grommet 655 by pressing the first and second scissor arms 515, 520 together using the first and first and second surfaces 540, 575. The first scissor arm 515 and the second scissor arm 520 are coupled to each other so that the edges of the scissor arms are slightly spaced apart from each other to allow the second scissor arm 520 to pivot through a plane defined by the edge of the first scissor arm 515. Stated another way, a plane defined by the edge of the second scissor arm 520 intersects the plane defined by the edge of the first scissor arm 515 when the first and second engagement surfaces are fully pressed together. The first and second grommet attachment portions 290 are inserted through the oval opening in the grommet 655 and the tapered end portions 565, 600 slide along the flexible arms 695 until the tapered end portions 565, 600 are beyond the tapered ends 700. The grommet 655 is disposed on the first and second grommet supports 560, 595 so that the first rim 685 is in an abutting relationship with the first and second walls 550, 585 and the tapered ends 700 are in an abutting relationship with the first and second hook member 590s to resist removal of the grommet 655 from the attachment mechanism 110. In this manner, the grommet 655 cannot be easily dislodged from the attachment mechanism 110 after assembly of the attachment mechanism 110 to the cleaning implement 115 and during operation of the cleaning device 10.

Because the grommet 655 is snap-fit into the grommet recess 750, an operator can grasp the tray 720 on the exterior portion of the sidewalls with one hand so that the operator can insert the attachment mechanism 110 into the grommet 655 with the other hand without touching the cleaning implement 115. The operator can further press the release mechanism 755 with the one hand to dislodge the grommet 655 from the grommet recess 750 and thereby remove the cleaning implement 115 from the tray 720.

The drive unit 105 is assembled by inserting the power source 175, the LCD screen 180, the first controller 185, the power switch 190, the power source 175 connection, the LEDs, the second controller 220, and the motor 225 into the first housing portion 140. The components in the first housing portion 140 can be electrically coupled to each other as appropriate before or after insertion into the first housing portion 140. The cover 165 is fastened to the first, second, and third compartments 160 to enclose the components in the first housing portion 140. The driven gear 245 is coupled to the free spinning shaft 250 and an engaged with the drive gear 235 protruding through the control housing 120. The sensor 127 is coupled to the second housing portion 145 above the axle 287 and is electrically connected to the first controller 185.

The springs 365 are coupled to the second housing portion 145, and the suspension arms 130 are then coupled to the second housing portion 145 so that the springs 365 are engaged with the spring grooves 375 on the suspension arms 130 and the gear portions 390 are engaged with and interact with each other. The wheel assembly 125 is assembled by sandwiching the tire 275 between the wheel 270 and the retainer 280. The wheel assembly 125 is then coupled to the axle 287 so that the integrated wheel gear 295 is engaged with the second gear portion 260 of the driven gear 245. The fastener is engaged with the axle 287 to secure the wheel assembly 125 to the second housing portion 145.

In constructions of the cleaning device 10 including separate pivot pins 405, the pivot pins 405 can be attached to the suspension arms 130 before or after the suspension arms 130 are attached to the second housing portion 145. The glides 135, 1000 are positioned on the suspension arms 130 so that the pivot pins 405 extend through the slots 410. The connector pins 420 are then inserted through the holes 415 in the glides 135, 1000 and engaged with the suspension arms 130 to hold the glides 135, 1000 on the second ends 385 of the suspension arms 130. The hook 460 is coupled to one of the glides 135, 1000 (e.g., the rearward facing glide 135, 1000), and the attachment mechanism 110 including the cleaning implement 115 is coupled to the other glide 135, 1000 (e.g. the forward facing glide 135, 1000). One or more of the extensions 620 can be used to lengthen the distance between the drive unit 105 and the cleaning implement 115 based on the characteristics of the conveyor system 15 in which the cleaning device 10 will be used.

In operation, the cleaning device 10 is inserted into an open end of the track 55 so that the flange 425 is engaged with the track elements 45. The biased suspension arms 130 and the pivotable glides 135, 1000 cooperate to align the cleaning device 10 in the track 55 so that the flange 425 is substantially engaged with the track elements 45 and the wheel assembly 125 is frictionally engaged with the track walls 40. The stabilizer 485 is engaged with the track 55 to hold the attachment mechanism 110 in a substantially horizontal orientation to maximize cleaning provided by the cleaning implement 115.

The biased suspension arms 130 and the pivotable glides 135, 1000 allow the cleaning device 10 to be used in conveyor systems with different track wall to track distances without any modification of the components. In particular, the suspension arms 130 can be pivoted a short distance against the bias of the springs 365 to accommodate a relatively deep product passageway 65, or the suspension arms 130 can be pivoted a relatively long distance to accommodate a relatively shallow product passageway 65. As illustrated, the distance between the outermost portion of the tire 275 and the flanges 425 on the glides 135, 1000 is larger than the depth of the product passageways in which the cleaning device 10 will operate. In this manner, the suspension arms 130 must be pivoted at least a small amount so that the flanges 425 can be engaged with the track 55. This small pivotal movement provides a bias force that holds the glides 135, 1000 in engagement with the track 55 and frictionally engages the tire 275 with the track walls 40 so that the cleaning device 10 can move along the track 55. The glides 135, 1000 pivot about the connector pins 420 so that the flange 425 remains substantially horizontal on the track 55 regardless of how much the suspension arms 130 are pivoted.

The cleaning device 10 moves from one end of the track 55 (i.e., the starting point adjacent an opening to the track 55) to the other end of the track 55, and then back to the starting point. As described herein, movement of the cleaning device 10 from the opening or starting point of the track 55 to the other end constitutes forward movement of the cleaning device 10, and movement of the cleaning device 10 from the other end back toward the opening or starting point constitutes rearward movement. Generally, movement of the cleaning device 10 along the track 55 one time in both directions (i.e., down and back) constitutes one cleaning cycle for the conveyor system 15.

FIGS. 57 and 58 illustrate logic control for operation of the cleaning device 10 after the cleaning device 10 is placed on the track 55. With regard to FIG. 57, the cleaning device 10 is powered on at step 800 by pressing the power switch 190, which connects the latch relay at step 805. At step 810, the first controller 185 determines whether one of the track markers 75 is detected by the sensor 127. If no track marker 75 is detected (i.e., "no" at step 810), the first controller 185 determines whether a predetermined time period has elapsed at step 815. If the predetermined time period has not elapsed (i.e., "no" at step 815), the logic control returns to step 810 to determine whether a track marker 75 is detected. If the predetermined time period has elapsed at step 815 (i.e., "yes" at step 815), the first controller 185 initiates a stop or stalled condition at step 825 and disconnects the latch relay at step 830.

If the first controller 185 detects a track marker 75 at step 810 (i.e., "yes" at step 810), the first controller 185 then determines at step 830 whether the detected track marker 75 is the first track marker 75. If the detected track marker 75 by the first controller 185 is not the first track marker 75 (i.e., "no" at step 830), the logic control for the cleaning device 10 initiates the stop condition at step 820 and the cleaning device 10 is turned off. On the other hand, if the first controller 185 detects the first track marker 75 (i.e., "yes" at step 830), the logic control enters a countdown phase at step 835. After the countdown phase has elapsed, the cleaning device 10 moves forward at a relatively slow speed (step 840).

At step 845, the first controller 185 determines whether another track marker 75 is detected as the cleaning device 10 moves along the track 55. If no track marker 75 is detected (i.e., "no" at step 845), the first controller 185 determines at step 850 whether a predetermined time period has elapsed. If the predetermined time period has not elapsed (i.e., "no" at step 850), the logic control returns to step 845 to determine whether a track marker 75 is detected. If the predetermined time period has elapsed (i.e., "yes" at step 850), the first controller 185 initiates the stop condition (step 820) and disconnects the latch relay (step 825).

If the first controller 185 detects a track marker 75 at step 845 (i.e., "yes" at step 845), the first controller 185 then determines at step 855 whether the detected track marker 75 is the second track marker 75. If the detected track marker 75 is not the second track marker 75 (i.e., "no" at step 855), the logic control for the cleaning device 10 moves to steps 820, 825 and the cleaning device 10 is turned off. On the other hand, if the first controller 185 detects the second track marker 75 at step 855 (i.e., "yes" at step 855), the cleaning device 10 accelerates to a normal operating speed (step 860).

At step 865, the first controller 185 determines whether another track marker 75 is detected as the cleaning device 10 moves further along the track 55. If no track marker 75 is detected (i.e., "no" at step 865), the first controller 185 determines at step 870 whether a predetermined time period has elapsed. If the predetermined time period has not elapsed (i.e., "no" at step 870), the logic control returns to step 865 to determine whether another track marker 75 is detected. If the predetermined time period has elapsed (i.e., "yes" at step 870), the first controller 185 initiates the stop condition (step 820) and disconnects the latch relay (step 825).

If the first controller 185 detects a track marker 75 at step 865, the first controller 185 then determines at step 875 whether the detected track marker 75 is the third track marker 75. If the detected track marker 75 is not the third track marker 75 (i.e., "no" at step 875), the logic control for the cleaning device 10 moves to steps 820, 825 and the cleaning device 10 is turned off. On the other hand, if the first controller 185 detects the third track marker 75 at step 875 (i.e., "yes" at step 875), the cleaning device 10 decelerates to a slow operating speed (step 880).

At step 885, the first controller 185 determines whether another track marker 75 is detected as the cleaning device 10 moves further along the track 55. If no track marker 75 is detected ("no" at step 885), the first controller 185 determines at step 890 whether a predetermined time period has elapsed. If the predetermined time period has not elapsed (i.e., "no" at step 890), the logic control returns to step 885 to determine whether another track marker 75 is detected. If the predetermined time period has elapsed (i.e., "yes" at step 890), the first controller 185 initiates the stop condition (step 820) and disconnects the latch relay (step 825).

If the first controller 185 detects a track marker 75 at step 885 (i.e., "yes" at step 885), the first controller 185 then determines at step 895 whether the detected track marker 75 is the fourth track marker 75. If the detected track marker 75 is not the fourth track marker 75 (i.e., "no" at step 895), the logic control for the cleaning device 10 moves to steps 820, 825 and the cleaning device 10 is turned off. On the other hand, if the first controller 185 detects the fourth track marker 75 at step 895, the cleaning device 10 stops (step 900) and moves in the rearward direction (back toward the beginning of the track 55) at a slow speed (step 905). In some constructions, the logic control can implement a predetermined time delay between when the cleaning device 10 stops and when the cleaning device 10 reverses direction.

With continued reference to FIG. 57, the cleaning device 10 operates in the rearward direction in the same manner as described with regard to movement of the cleaning device 10 from the beginning of the track 55 to the end of the track 55. In particular, with the cleaning device 10 moving toward the beginning of the track 55 at a relatively slow speed, the first controller 185 determines at step 910 whether one of the track markers 75 is detected. If no track marker 75 is detected (i.e., "no" at step 910), the first controller 185 determines whether a predetermined time period has elapsed at step 915. If the predetermined time period has not elapsed (i.e., "no" at step 915), the logic control returns to step 910 to again determine whether a track marker 75 is detected. If the predetermined time period has elapsed at step 915 (i.e., "yes" at step 915), the first controller 185 initiates the stop condition at step 820 and disconnects the latch relay at step 825.

If the first controller 185 detects a track marker 75 at step 910 (i.e., "yes" at step 9 and 10), the first controller 185 then determines at step 920 whether the detected track marker 75 is the third track marker 75. If the detected track marker 75 by the first controller 185 is not the third track marker 75 (i.e., "no" at step 920), the logic control for the cleaning device 10 initiates the stop condition at step 820 and the cleaning device 10 is turned off at step 825. On the other hand, if the first controller 185 detects the third track marker 75 (i.e., "yes" at step 920), the cleaning device 10 accelerates to the normal operating speed (step 925) in the rearward direction (i.e. toward the beginning of the track 55).

At step 930, the first controller 185 determines whether another track marker 75 is detected as the cleaning device 10 moves rearward along the track 55. If no track marker 75 is detected (i.e., "no" at step 930), the first controller 185 determines at step 935 whether a predetermined time period has elapsed. If the predetermined time period has not elapsed (i.e., "no" at step 935), the logic control returns to step 930 to again determine whether a track marker 75 is detected. If the predetermined time period has elapsed (i.e., "yes" at step 935), the first controller 185 initiates the stop condition and disconnects the latch relay.

If the first controller 185 detects a track marker 75 at step 930 (i.e., "yes" at step 930), the first controller 185 then determines at step 940 whether the detected track marker 75 is the second track marker 75. If the detected track marker 75 is not the second track marker 75 (i.e., "no" at step 940), the logic control for the cleaning device 10 moves to 820, 825 and the cleaning device 10 is turned off. On the other hand, if the first controller 185 detects the second track marker 75 at step 940 (i.e., "yes" at step 940), the cleaning device 10 decelerates from the normal operating speed to a relatively slow speed (step 945).

At step 950, the first controller 185 determines whether another track marker 75 is detected as the cleaning device 10 moves further along the track 55 in the rearward direction. If no track marker 75 is detected (i.e., "no" at step 950), the first controller 185 determines at step 955 whether a predetermined time period has elapsed. If the predetermined time period has not elapsed (i.e., "no" at step 955), the logic control returns to step 950 to again determine whether another track marker 75 is detected. If the predetermined time period has elapsed (i.e., "yes" at step 955), the first controller 185 initiates the stop condition (step 820) and disconnects the latch relay (step 820). If the first controller 185 detects a track marker 75 (e.g., the first track marker 75) at step 950, the logic control for the cleaning device 10 is stopped and turned off (steps 820, 825).

The first controller 185 determines the presence of one of the track markers 75 using signals transmitted by the sensor 127. In the illustrated construction, the sensor 127 detects the specific magnetic fields generated by the North pole and South pole track markers 75 and generates a signal (e.g., voltage change signal) indicative of the magnetic field. The first controller 185 interprets the signal from the sensor 127 and adjusts operation of the cleaning device 10 accordingly. The illustrated cleaning device 10 is controlled by a set of four track markers 75 that are sensed by the sensor 127 as the cleaning device 10 moves along the track 55. As discussed in detail with regard to the logic control illustrated in FIG. 57, depending on the polarity detected by the sensor 127, the cleaning device 10 will start, stop, accelerate, or slow down.

In the illustrated construction, the sequence of polarity detected by the sensor 127 is important in controlling operation of the cleaning device 10. The speed of the cleaning device 10 is adjusted to move relatively slowly when the sensor 127 detects the polarity of the first track marker 75, and accelerates to a normal speed when the sensor 127 detects the polarity of the second track marker 75. The cleaning device 10 slows down in response to the sensor 127 detecting the polarity of the third track marker 75, and the cleaning device 10 stops and reverses direction in response to the sensor 127 detecting the polarity of the fourth track marker 75. With regard to the illustrated conveyor system 15, the track markers 75 are arranged along the track 55 with a polarity pattern of North (start|stop), South (accelerate|decelerate), South (decelerate|accelerate), North (stop and reverse). The logic control for the cleaning device 10 starts, accelerate, decelerate, and stops and reverses the cleaning device 10 as the device 10 moves from the opening of the track 55 to the other end of the track 55 (i.e., the forward direction). The logic control for the cleaning device 10 accelerates, decelerates, and stops the cleaning device 10 as the device 10 moves from the other end of the track 55 back toward the opening (i.e., the rearward direction).

As described above, in some constructions the sensor position can be adjusted to adapt the cleaning device 10 to conveyors with different product passageway 65 depths so that the sensor 127 is the same distance from the track 55 as the track markers 75. The track markers 75 are oriented so that the sensor 127 passes in close proximity (e.g., 1-4 inches) to each of the track markers 75. Generally, the track markers 75 are oriented to be as close as possible to the sensor 127 as the cleaning device 10 passes without interfering with product that moves along the track 55. In addition, the sensor 127 is responsive to the polarity of the track markers 75 so that operation of the cleaning device 10 is adjusted relatively quickly (e.g., within 1 inch of the track marker 75). In other words, the cleaning device 10 does not "overrun" the sensed track marker 75 after the signal from the sensor 127 is received by the first controller 185.

As shown in FIG. 58, the cleaning device 10 includes secondary logic control (e.g., for the motor 225) that is initiated at step 960. The secondary logic control continuously senses abnormal conditions of the cleaning device 10. For example, at step 965, the first controller 185 detects whether the cleaning device 10 has stalled during operation based on an over-current condition in the motor 225. If the first controller 185 determines that the current supplied to the motor 225 is within a predetermined range (i.e., "no" at step 965), the secondary logic control loops back to make another determination. On the other hand, if the first controller 185 determines that the motor 225 is experiencing an over-current condition (i.e., "yes" at step 965), the first controller 185 then determines at step 970 whether a predetermined time period has elapsed. If the predetermined time period has not elapsed (i.e., "no" at step 970), the secondary logic control returns to step 95 to again determine whether an over-current condition exists. If the predetermined time period has elapsed (i.e., "yes" at step 970), the first controller 185 initiates the stop condition (step 975) and disconnects the latch relay (step 980). In other constructions, the cleaning device 10 can include other logic control that monitors various conditions of the cleaning device 10 (e.g., slippage of the tire, obstructions encountered by the cleaning device 10, air states associated with the electronic controls, etc.) as the device 10 moves forward and rearward along the track 55.

Figure 60:
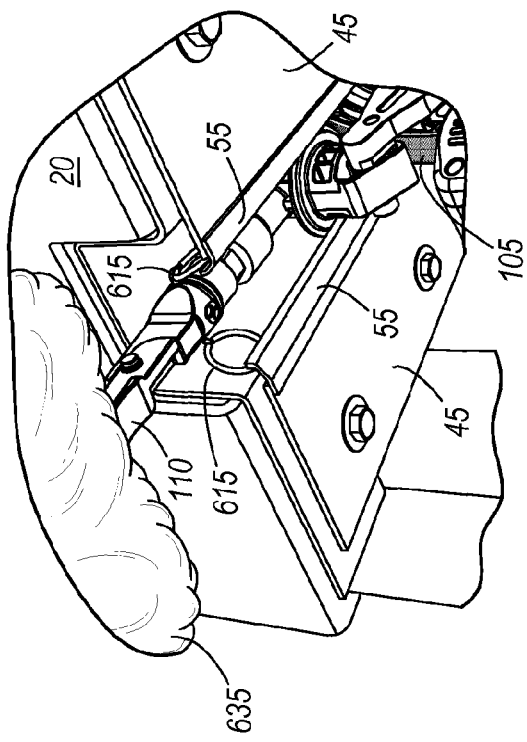
FIG. 60 is another perspective view of a portion of the cleaning device and the conveyor system.
Figure 61:
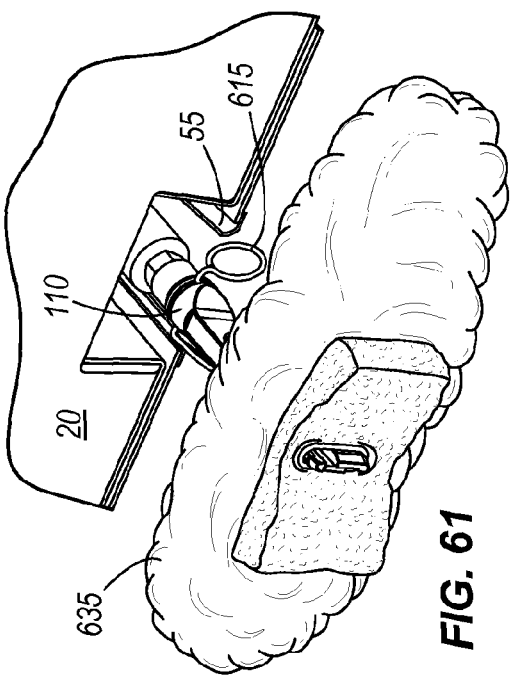
FIG. 61 is another perspective view of a portion of the cleaning device and the conveyor system.
Figure 59:
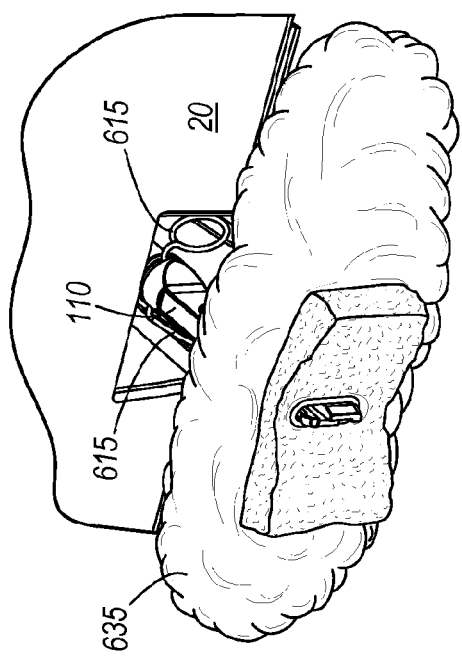
FIG. 59 is a perspective view of a portion of the cleaning device and the conveyor system.

In some constructions, the cleaning implement 115 and the attachment mechanism 110 fall out of the air conveyor 20 when the cleaning device 10 reaches the other end of the track 55. As illustrated in FIGS. 59-61, the stabilizer 485 elevates the attachment mechanism 110 and the cleaning implement 115 within the track 55. The extensions 620 allow an operator to customize the cleaning device 10 to suit the characteristics of the conveyor system 15 on which the cleaning device 10 will be used. Generally, the extensions 620 can be used so that the cleaning implement 115 can reach the end of the track 55 without the drive unit 105 falling out of the track 55 or becoming trapped by obstructions within the track 55.

Depending on the length of the cleaning device 10 and the distance from the fourth track marker 75 to the end of the track 55, the stabilizer 485 can fall off the track 55 if the cleaning device 10 moves sufficiently close to the opening of the track 55 (see FIG. 61). The stabilizer 485 facilitates re-positioning the attachment mechanism 110 and the cleaning implement 115 into the air conveyor 20 when the cleaning device 10 moves in the rearward direction due to engagement of the track engagement portions 615 with the end of the track 55. With reference to FIG. 61, the stabilizer 485 "lifts" the attachment mechanism 110 and the cleaning implement 115 back up into the conveyor.

The tire 275 engages the track walls 40 and the motor 225 is turned on to rotate the wheel 270 so that the cleaning device 10 can move along the track 55. The motive force provided by the motor 225, the treads 335 on the tire 275, and the bias force associated with the suspension arms 130 cooperate to move the cleaning device 10 through the conveyor system 15. The pivotable glides 135, 1000 ensure that the flange 425 is substantially flat as the cleaning device 10 moves along the track 55, and that the cleaning device 10 remains in the slotted track 55. In particular, the first engagement surface 435 of the flange 425 is primarily engaged with the track elements 45 to support the cleaning device 10 on the track 55. The second engagement surface 440 centers the drive unit 105 in the track 55 so that the cleaning device 10 is not dislodged from the track 55 (e.g., long curved portions of the track 55). The flexible member 495 allows the attachment mechanism 110 and the cleaning implement 115 to bend relative to the glide 135, 1000 (e.g. when the cleaning device 10 negotiates curves or turns in the track 55).

The pad assembly 635, which is soaked in the cleaning solution, cleans the track 55 as the cleaning device 10 moves forward and rearward along the track 55. The flexibility of the pad assembly 635 allows the pads 640, 645, 650 to conform to the shape of the product passageway 65 and clean the surfaces in the product passageway 65. When the cleaning device 10 is placed on the track 55, the distal ends of the pad assembly 635 are folded or bent toward the attachment mechanism 110. With reference to FIGS. 59-61, the distal ends of the pad assembly 635 flex back to an elongated state when the cleaning device 10 reaches the other end of the track 55. When the cleaning device 10 reverses and moves in the rearward direction back toward the opening, the distal ends are folded or bent away from the attachment mechanism 110. In this manner, one side of the first pad 640, the second pad 645, and the third pad 650 cleans the surfaces in the product channel 70 as the cleaning device 10 moves in the forward direction, and the other side of the first pad 640, the second pad 645, and the third pad 650 cleans the surfaces in the product channel 70 as the cleaning device 10 moves in the rearward direction. Thus, both sides of the cleaning implement 115 can be utilized to clean the track 55 by virtue of the flexible pad assembly 635 so that clean surfaces of the cleaning implement 115 are exposed to the track 55 upon a change in direction of the cleaning device 10.

As illustrated in FIG. 3, the cleaning device 10 can also include guide rail cleaning heads 780 that are coupled to the control housing 120 for cleaning the guide rails 50 adjacent the product channel 70. The guide rail cleaning heads 780 can be attached to the control housing 120 in any suitable manner (e.g., by an attachment mechanism 110 similar to the attachment mechanism 110 described with regard to FIGS. 30-37). The guide rail cleaning heads 780 include one or more cleaning pads 785 (e.g., duster pad material, abrasive material, etc.) that can be dry or be soaked with a cleaning solution. Generally, the guide rail cleaning heads 780 utilized friction to clean the guide rails 50.

In the event of the cleaning device 10 stalls (e.g., experiences an over-current condition as discussed with regard to FIG. 58) while traversing the length of the conveyor, the hook 460 can be used to retrieve the cleaning device 10 from within the product passageway 65. In particular, a pole with a loop or another similar device 10 can be coupled to the hook 460, and the device 10 can then be manually pulled back toward the entrance to the conveyor 20. With regard to the non-motorized version of the cleaning device 10, the cleaning device 10 is manually manipulated using the hook 460 and a line (e.g., a pole and a loop coupled to the pole) to move the cleaning device 10 forward and rearward along the track 55.

Various features and advantages of the invention are set forth in the following claims.

The invention claimed is:

1. A cleaning device for cleaning a conveyor system including a slotted track that defines an elongate path along which product is moved and that has opposed glide surfaces from which product is suspended, the conveyor system also including a wall disposed above the slotted track and cooperating with the track to define a product passageway along the elongate path, the cleaning device comprising:
a drive unit;
a wheel rotatably coupled to the drive unit and biased into engagement with the wall within the product passageway to move the drive unit along the slotted track;
a glide coupled to the drive unit and engageable with the glide surfaces to support the drive unit on the slotted track; and
a cleaning implement coupled to the drive unit and positionable within the product passageway to clean the track.

2. The cleaning device of claim 1, wherein the wheel defines a central plane of the cleaning device and the glide is aligned with the wheel along the central plane.

3. The cleaning device of claim 1, wherein the drive unit includes a housing, the cleaning device further comprising a power source and a motor disposed in the housing and operably coupled to the wheel to move the drive unit along the slotted track.

4. The cleaning device of claim 3, further comprising a controller in electrical communication with the motor and the power source to control movement of the drive unit.

5. The cleaning device of claim 4, further comprising a sensor device coupled to the drive unit and positioned to detect a track marker positioned along the slotted track, wherein the sensor device is in communication with the controller, and wherein movement of the drive unit is controlled in response to detection of the track marker.

6. The cleaning device of claim 5, wherein the sensor device is operable to detect a magnetic field of the track marker.

7. The cleaning device of claim 5, wherein the drive unit is adapted to at least one of start, stop, accelerate, and slow down in response to detection of the track marker.

8. The cleaning device of claim 5, wherein the drive unit is adapted to reverse direction in response to detection of the track marker.

9. The cleaning device of claim 1, wherein the cleaning implement is attached to the glide.

10. The cleaning device of claim 9, further comprising an attachment mechanism coupled between the glide and the cleaning implement, and wherein the cleaning implement is removably coupled to the attachment mechanism.

11. The cleaning device of claim 10, wherein the attachment mechanism includes a stabilizer engageable with the track to support the attachment mechanism above the track.

12. The cleaning device of claim 1, further comprising a suspension arm pivotably coupled to the drive unit and biased to force the wheel into engagement with the wall, and wherein the glide is coupled to a distal end of the suspension arm.

13. The cleaning device of claim 12, wherein the suspension arm is a first suspension arm and the glide is a first glide coupled to the first suspension arm adjacent a first end of the drive unit, the cleaning device further including a second suspension arm pivotably coupled to the drive unit and biased to cooperatively force the wheel into engagement with the wall, and a second glide coupled to a distal end of the second suspension arm and located adjacent a second end of the drive unit opposite the first end.

14. The cleaning device of claim 13, further comprising a hook coupled to the second glide to manually manipulate the drive unit within the slotted track.

15. The cleaning device of claim 12, wherein the glide includes an alignment key and is pivotably coupled to the suspension arm by a connector pin.

16. The cleaning device of claim 15, wherein the glide defines a slot and the suspension arm has a pivot pin disposed in the slot to limit pivotal movement of the glide.

17. The cleaning device of claim 15, wherein the alignment key has a flange shaped to substantially match the shape of an upper end of the product distributed through the conveyor system.

18. The cleaning device of claim 17, wherein the flange is substantially circular and has a diameter substantially corresponding to the diameter of a neck finish of the product supported by the track.

19. The cleaning device of claim 17, wherein the flange has a first engagement surface and a second engagement surface that is wider than and tapered from the first engagement surface toward the perimeter of the flange.

20. The cleaning device of claim 1, further comprising a cleaning head including a cleaning pad coupled to a side of the drive unit to clean a portion of the conveyor system.

21. The cleaning device of claim 1, wherein the wheel is resiliently biased under spring force into engagement with the wall within the product passageway.

* * * * *